(12) United States Patent
Hara et al.

(10) Patent No.: US 12,286,207 B2
(45) Date of Patent: Apr. 29, 2025

(54) CONTROL TARGET GENERATION DEVICE AND SHIP-STEERING CONTROL DEVICE

(71) Applicant: Yanmar Power Technology Co., Ltd., Osaka (JP)

(72) Inventors: Naohiro Hara, Osaka (JP); Tomoya Fukukawa, Osaka (JP); Yuichiro Dake, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 534 days.

(21) Appl. No.: 17/296,995

(22) PCT Filed: Nov. 26, 2019

(86) PCT No.: PCT/JP2019/046110
§ 371 (c)(1),
(2) Date: May 26, 2021

(87) PCT Pub. No.: WO2020/111044
PCT Pub. Date: Jun. 4, 2020

(65) Prior Publication Data
US 2022/0001970 A1 Jan. 6, 2022

(30) Foreign Application Priority Data
Nov. 27, 2018 (JP) ................................. 2018-221182

(51) Int. Cl.
*B63H 25/04* (2006.01)
*B63H 25/42* (2006.01)
*G05D 1/00* (2024.01)

(52) U.S. Cl.
CPC ............ *B63H 25/04* (2013.01); *B63H 25/42* (2013.01); *G05D 1/0206* (2013.01); *B63H 2025/045* (2013.01)

(58) Field of Classification Search
CPC ...... B63H 25/04; B63H 25/42; B62K 11/007; B63B 35/00; G01C 21/203; G01C 21/20;
(Continued)

(56) References Cited

U.S. PATENT DOCUMENTS

| 4,893,246 A * | 1/1990 | Iihoshi ..................... G01D 7/00 340/995.22 |
| 2006/0097683 A1* | 5/2006 | Hosoda ................ B62K 11/007 318/568.12 |

(Continued)

FOREIGN PATENT DOCUMENTS

| JP | 11002534 A | 1/1999 | |
| JP | H112534 A * | 1/1999 | ............. G01C 21/00 |

(Continued)

*Primary Examiner* — Yuri Kan
(74) *Attorney, Agent, or Firm* — Chris Mizumoto

(57) ABSTRACT

A control target controller generates control targets in accordance with a route, the control targets being for controlling the location and orientation of a ship. The route has a plurality of via points. Each of the via points has information about a target location and a target orientation for the ship. The route is made up of a plurality of partial routes that sequentially connect the target locations of the via points. The control target controller comprises a transit target point generation part and an arrival determination part. The transit target point generation part can generate, as control targets, transit target points that are in the middle of the partial routes and have information about a target location and a target orientation for the ship. On the basis of the current location and the current orientation of the ship, the arrival determination part determines whether the ship has arrived at the transit target points.

15 Claims, 10 Drawing Sheets

(58) Field of Classification Search
CPC ............ G01S 19/19; B64C 39/12; G01D 7/00; G08G 3/02
See application file for complete search history.

(56) References Cited

U.S. PATENT DOCUMENTS

| | | | |
|---|---|---|---|
| 2011/0005450 A1* | 1/2011 | Aharonian | B63B 35/00 114/264 |
| 2013/0174769 A1* | 7/2013 | Aharonian | G01C 21/203 114/71 |
| 2017/0219351 A1* | 8/2017 | Hamilton | G01S 19/19 |
| 2017/0255200 A1 | 9/2017 | Arbuckle et al. | |
| 2020/0166350 A1* | 5/2020 | Gitz | G01C 21/20 |
| 2020/0172256 A1* | 6/2020 | Kroo | B64C 39/12 |

FOREIGN PATENT DOCUMENTS

| | | | | |
|---|---|---|---|---|
| JP | 2004355105 A | | 12/2004 | |
| JP | 2007230455 A | * | 9/2007 | ............ G01C 21/203 |
| KR | 20120128741 A | * | 11/2012 | ............... G08G 3/00 |

\* cited by examiner

CONTROL TARGET GENERATION DEVICE AND SHIP-STEERING CONTROL DEVICE

CROSS-REFERENCE

This application is a US National Stage Application under 35 U.S.C. § 371 of International Application No. PCT/JP2019/046110 filed Nov. 26, 2019 which claims foreign priority of JP2018-221182 filed Nov. 27, 2018, the disclosures of which are hereby incorporated by reference in their entirety.

TECHNICAL FIELD

The present invention primarily relates to a control target generation device that generates a control target regarding a location and an orientation of a ship.

BACKGROUND ART

There is a conventionally known ship-steering device that enables the automatic navigation of a ship. Patent Literature 1 and 2 discloses a ship including this type of ship-steering device.

A small-sized ship in Patent Literature 1 includes a controller. The controller generates a command signal for controlling a propulsion device so as to dock a ship at the target location. The controller calculates a relative error between the target location and the current location and between the target orientation and the current orientation and determines the target velocity/angular velocity based on the relative error. The controller reduces the target velocity/angular velocity in accordance with a decrease in the relative error. That is, the controller reduces the target velocity as the current location of the ship becomes closer to the target location. Furthermore, the controller reduces the target angular velocity as the current orientation of the ship becomes closer to the target orientation. Then, when the distance between the current location of the ship and the target location falls within a predetermined range including zero, the controller sets the target velocity to zero. Moreover, when the difference between the current orientation of the ship and the target orientation falls within a predetermined range including zero, the controller sets the target angular velocity to zero.

A ship in Patent Literature 2 includes a ship-steering control device. The ship-steering control device may calculate a route based on its own location and the set destination on the basis of information from a GPS device so as to automatically navigate the ship. The ship-steering control device calculates the difference between a current coordinate $P(n)$ of the ship and a target coordinate $Pt$ of the ship and converts the target coordinate $Pt$ into a target polar coordinate $Po(n)$ represented by a distance $L(n)$ from the current coordinate $P(n)$ and a moving direction $\theta(n)$. Then, after acquiring the current coordinate $P(n)$, the ship-steering control device moves the ship from the current coordinate $P(n)$ to a current coordinate $P(n+1)$ in the moving direction $\theta(n)$ by movement control and turns the ship from a current orientation $Az(n)$ to a current orientation $Az(n+1)$ by turning control.

Here, it is assumed that the moving direction $\theta(n)$ of the ship at the current coordinate $P(n)$ is likely to deviate from the direction at the target coordinate $Pt$ due to the effect of the turning control. Here, the ship-steering control device moves the ship in a target moving direction $\theta t(n)$ in consideration of the current orientation $Az(n+1)$ when the ship moves to the current orientation $Az(n+1)$ by turning correction control. As a result, the ship-steering control device corrects the effect of the deviation in the moving direction $\theta(n)$ due to the turning control so that the ship may be controlled so as to draw a substantially linear trajectory connecting the current coordinate $P(n)$ and the target coordinate $Pt$.

CITATION LIST

Patent Literature

Patent Literature 1: WO 2018/100748
Patent Literature 2: Japanese Unexamined Patent Publication No. 2016-83974

DISCLOSURE OF INVENTION

Problems to be Solved by the Invention

With the configuration in Patent Literature 1 described above, it may be difficult to automatically navigate a ship with high accuracy between the current location of the ship and the target location, and there is room for improvements in this aspect.

With the configuration in Patent Literature 2 described above, as the turning control correction is performed, it is possible to perform control so as to draw a substantially linear trajectory when the ship heads from the current coordinate to the target coordinate. As a result, it is considered that the curved trajectory of the ship during movement to the target location is suppressed. However, with the configuration in Patent Literature 2, when oblique sailing and turning are simultaneously performed, the movement trajectory of the ship deviates due to the effect of the transverse fluid force (for example, cross flow) occurring around the ship, and it may be difficult to automatically navigate the ship with high accuracy.

The present invention has been made in view of the above circumstances, and its object is to provide a control target generation device that navigates a ship with high accuracy in accordance with a route.

Means for Solving the Problems

Effect of the Invention

The problem to be solved by the present invention is as described above, and the means for solving this problem and the effect are described below.

According to a first aspect of the present invention, a control target generation device having the following configuration is provided. Specifically, the control target generation device generates a control target for controlling a location and an orientation of a ship in accordance with a route. The route includes a plurality of control points. Each of the control points has information about a target location and a target orientation of the ship. The route includes a plurality of partial routes that sequentially connects the target locations of the control points. The control target generation device includes a transit target point generating unit and an arrival determining unit. The transit target point generating unit is capable of generating, as the control target in a middle part of the partial route, a transit target point having information about the target location and the target orientation of the ship. The arrival determining unit determines whether the ship has arrived at the transit target point based on a current location and a current orientation of the ship.

Therefore, an intermediate control target regarding the location and the orientation of the ship may be generated as a transit target point between the control points of the route so that the arrival at the transit target point may be determined. Thus, the ship may be navigated with high accuracy between the control points in accordance with the route.

The control target generation device preferably has the following configuration. Specifically, the transit target point generating unit updates the transit target point when the arrival determining unit determines that the ship has arrived at the transit target point. When the transit target point is updated, the target location and the target orientation of the transit target point are changed so as to be closer to the target location and the target orientation of the control point at an end point of the partial route.

Thus, as the transit target point is updated under the condition that the ship has arrived at the transit target point, it is possible to ensure that the location and the orientation of the ship are sequentially controlled in each divided step between the control points.

In the control target generation device, it is preferable that a magnitude of change in the target location and the target orientation of the transit target point by each update is constant in at least a part of the route.

Thus, the stable navigation of the ship may be achieved.

The control target generation device preferably has the following configuration. Specifically, an end point of the route is a docking location at which the ship is docked. A change in the target location and the target orientation of the transit target point by each update becomes smaller as a distance to the docking location becomes shorter.

Thus, it is possible to perform finer control on the location of the ship, and the like, as the distance to the docking location becomes shorter. As a result, particularly accurate control may be performed at the final stage of the navigation for docking.

In the control target generation device, in a case where a magnitude of change in an orientation of the route at the end point of the partial route is more than a predetermined value, a change in the target location and the target orientation of the transit target point by each update is preferably small when the transit target point is close to the end point of the partial route.

Therefore, in a case where the orientation of the route largely changes at a certain control point, fine control is performed when the distance to the control point is short so that the actual movement trajectory of the ship may be prevented from deviating from the route.

In the control target generation device, the arrival determining unit preferably determines whether the ship has arrived at the transit target point in consideration of a distance between the partial route and the current location of the ship.

Therefore, the arrival determination may be made in consideration of whether the current location of the ship is sufficiently close to the partial route. Thus, it is possible to ensure that the ship is controlled to move along the partial route.

The control target generation device preferably has the following configuration. Specifically, an end point of the route is a docking location at which the ship is docked. The arrival determining unit determines whether the ship has arrived at the transit target point more strictly as a distance to the docking location becomes shorter.

Thus, particularly accurate control may be performed on the location and the orientation of the ship at the final stage of the navigation for docking.

In the control target generation device, in a case where a magnitude of change in an orientation of the route at an end point of the partial route is more than a predetermined value, the arrival determining unit preferably determines whether the ship has arrived strictly when the transit target point is close to the end point.

Thus, in a case where the orientation of the route largely changes at a certain control point, particularly accurate control regarding the location and the orientation of the ship is performed when the distance to the control point is short so that the actual movement trajectory of the ship may be prevented from deviating from the route.

The control target generation device preferably has the following configuration. Specifically, the arrival determining unit is capable of determining whether the current location of the ship precedes the target location of the transit target point in the partial route. When the arrival determining unit determines that the current location of the ship precedes, the transit target point generating unit updates the transit target point so as to change the target location and the target orientation.

Thus, it is possible to reduce the navigation of the ship in the opposite direction.

In the control target generation device, in a case where the arrival determining unit determines that the current location of the ship precedes, the transit target point generating unit preferably updates the transit target point under a condition that a difference between a current orientation of the ship and the target orientation of the transit target point falls within a predetermined range.

Thus, the accuracy of the orientation control on the ship may be ensured.

The control target generation device preferably includes a display data generating unit that generates display data for displaying a target location and a target orientation of the transit target point in a graphic form.

This allows the user looking at the display to easily understand how the location and the orientation of the ship are currently controlled between the control points.

According to a second aspect of the present invention, a ship-steering control device having the following configuration is provided. Specifically, the ship-steering control device includes the control target generation device and a propulsion control device. The propulsion control device controls a propulsion device of the ship such that the current location of the ship becomes closer to the target location of the control target and the current orientation of the ship becomes closer to the target orientation of the control target.

Thus, the ship may be automatically navigated with high accuracy in accordance with the route between the control points.

The ship-steering control device may have the following configuration. Specifically, the propulsion control device sets a target velocity of the ship based on a location deviation that is a deviation between the target location input from the control target generation device and the current location of the ship. The propulsion control device controls the propulsion device of the ship such that a current velocity of the ship becomes closer to the target velocity of the ship. The propulsion control device has a target velocity calculation model for determining a magnitude of the target velocity of the ship based on the location deviation. The arrival determining unit determines that the ship has arrived at the target location when a distance between the target location and the current location of the ship is less than a threshold. The arrival determining unit has an inverse model of the target velocity calculation model. The arrival determining unit obtains the location deviation corresponding to a magnitude of a target cruising velocity from the inverse model and, based on the obtained location deviation, sets the threshold regarding the distance between the target location and the current location of the ship.

Thus, setting a high target cruising velocity enables the automatic navigation at a high velocity.

The ship-steering control device preferably has the following configuration. Specifically, the propulsion control device includes a first thrust calculating unit, a second thrust calculating unit, and a synthetic thrust calculating unit. The first thrust calculating unit calculates a thrust to be applied to the ship so as to bring the current location of the ship closer to the target location of the control target and bring the current orientation of the ship closer to the target orientation of the control target. The second thrust calculating unit calculates a thrust to be applied to the ship so as to bring the current velocity of the ship closer to the target cruising velocity in accordance with a deviation between the target cruising velocity and the current velocity of the ship in a direction in which the ship is to travel. The synthetic thrust calculating unit is capable of synthesizing the thrust calculated by the first thrust calculating unit and the thrust calculated by the second thrust calculating unit and is capable of changing a synthesis ratio. The propulsion device of the ship is controlled based on the synthesized thrust output from the synthetic thrust calculating unit.

Thus, the automatic navigation may be performed while the degree of emphasis on the location accuracy of the ship and the degree of emphasis on the velocity of the ship are flexibly changed depending on the situation.

The ship-steering control device preferably has the following configuration. Specifically, the synthetic thrust calculating unit determines the synthesis ratio based on at least any of a relative current location of the ship with respect to the target location of the control target and a difference between the target orientation of the control target and the current orientation of the ship.

Thus, based on the relationship of the current location and the current orientation of the ship to the target location and the target orientation of the control target, the automatic navigation with an emphasis on the location accuracy of the ship may be executed or the automatic navigation with an emphasis on the velocity may be executed.

DESCRIPTION OF EMBODIMENTS

Figure 1:
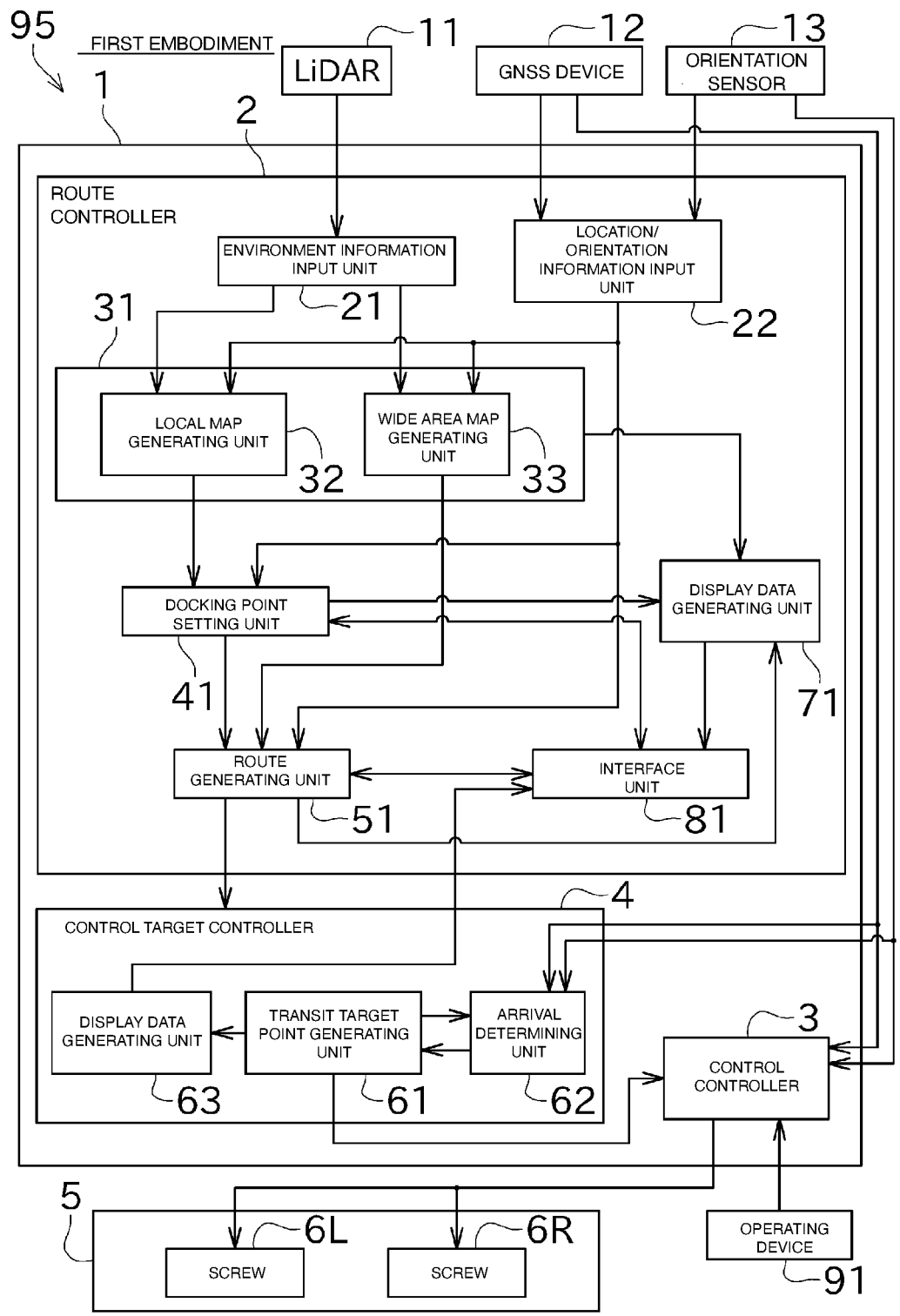
FIG. 1 is a block diagram illustrating an electrical configuration of a ship-steering control device according to a first embodiment of the present invention.

Next, an embodiment of the present invention is described with reference to the drawings. FIG. 1 is a block diagram illustrating an electrical configuration of a ship-steering control device 1 according to a first embodiment of the present invention.

The ship-steering control device 1 illustrated in FIG. 1 is installed in a ship 95 to be used. The ship-steering control device 1 enables the automatic navigation of the ship 95. The automatic navigation includes the automatic docking of the ship 95.

The term "docking" in this description includes a case where the ship 95 is docked in a docking facility. The "docking facility" refers to a place where a ship may be docked, regardless of whether it is a natural object or an artificial object. The docking facilities include deep quay walls, shallow quay walls, landing piers, floating docks, etc.

The configuration of the ship 95 to which the ship-steering control device 1 is applied is not particularly limited and may be, for example, a pleasure boat, a fishing boat, a water-jet ship, an electric propulsion ship, or a hybrid ship.

The ship 95 includes a propulsion device 5.

The propulsion device 5 includes a pair of screws 6L, 6R. The screws 6L, 6R are provided on the right and left sides of the stern of the ship 95. The propulsion device 5 may rotate the screws 6L, 6R by the driving force of a driving source (an engine or an electric motor). The directions of the respective rotational axes of the screws 6L, 6R may be changed around the axes in a vertical direction. The directions of the rotational axes, stoppage/forward rotation/reverse rotation, and the rotation speeds of the screws 6L, 6R may be changed independently of each other. The control on the screws 6L, 6R may enable various types of ship steering including parallel displacement in a horizontal direction, turning in a certain position, etc., in addition to forward movement/backward movement of the ship 95.

The screws 6L and 6R may be configured as screws for a sterndrive or an outboard engine. It is possible to provide, instead of the screws 6L and 6R, a pair of right and left water jets whose direction and speed of water jetting may be changed independently of each other.

The ship-steering control device 1 includes a route controller (route generation device) 2, a control target controller (control target generation device) 4, and a control controller (propulsion control device) 3.

The route controller 2 may generate a route for automatically navigating the ship 95. The route controller 2 includes an environment information input unit 21, a location/orientation information input unit 22, a map generating unit 31, a docking point setting unit 41, a route generating unit 51, a display data generating unit 71, and an interface unit 81.

Specifically, the route controller 2 is configured as a computer including a CPU, a ROM, and a RAM. The ROM stores a program for operating the route controller 2. The cooperation of the above-described hardware and software may cause the route controller 2 to function as the environment information input unit 21, the location/orientation information input unit 22, the map generating unit 31, the docking point setting unit 41, the route generating unit 51, the display data generating unit 71, and the interface unit 81.

The environment information input unit 21 receives the input of environment data on the surroundings acquired by a LiDAR 11 included in the ship 95. The LiDAR 11 may be installed, for example, near the bow.

The LiDAR 11 emits pulsed light so as to detect the presence or absence of a surrounding object with the reflected light. When there is an object, the LiDAR 11 detects the orientation of and the distance to the object based on the direction of the pulsed light when the reflected light is received and the time before the light is received. Based on this detection result, the LiDAR 11 acquires the point group data representing an object existing in the surroundings.

The location/orientation information input unit 22 receives the input of the location data on the ship 95 acquired by a GNSS device 12 included in the ship 95. Further, the location/orientation information input unit 22 receives the input of the orientation data on the ship 95 acquired by an orientation sensor 13 included in the ship 95.

The GNSS device 12 receives a GNSS radio wave from a satellite and performs a known positioning calculation to acquire the current location of the ship 95. Although GNSS positioning may be independent positioning, it is preferable to use known DGNSS positioning or RTK (real-time kinematic) positioning in respect of acquisition of the position of the ship 95 with high accuracy.

The orientation sensor 13 acquires the orientation of the bow of the ship 95. The orientation sensor 13 may be, for example, a magnetic orientation sensor or a satellite compass.

The map generating unit 31 generates an environment map. The environment map is a map used for route planning. The map generating unit 31 includes a local map generating unit 32 and a wide area map generating unit 33.

The local map generating unit 32 generates an environment map in a local area including a docking location. In other words, the local map generating unit 32 generates an environment map near a docking facility. In the following description, the environment map generated by the local map generating unit 32 may be referred to as a local map.

Figure 2:
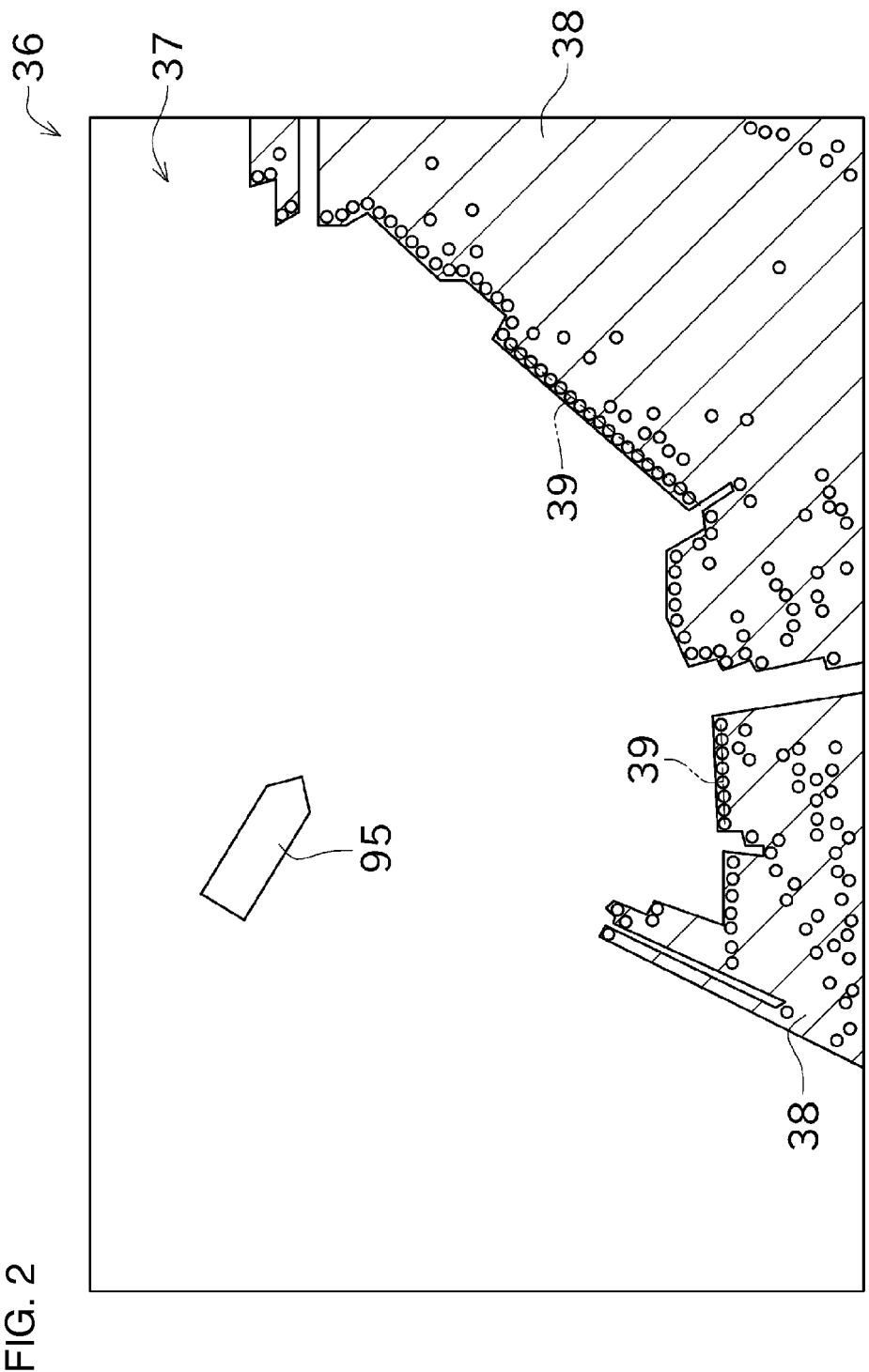
FIG. 2 is a diagram illustrating an example of an environment map generated by a local map generating unit and a straight line detected by a docking point setting unit.

FIG. 2 illustrates an example of a local map 36. For convenience of explanation, FIG. 2 also illustrates the current location and orientation of the ship 95.

As illustrated in FIG. 2, the local map 36 includes an area (i.e., a free space 37) in which no object is detected by the LiDAR 11 and it is determined that the ship 95 may be navigated. Furthermore, the local map 36 includes a group of points indicating objects detected by the LiDAR 11. The area on the other side of the objects detected by the LiDAR 11 as viewed from the ship 95 is an occlusion area 38 in which the presence or absence of an object is unknown.

The wide area map generating unit 33 generates an environment map including other than the area of the local map 36. In the following description, the environment map generated by the wide area map generating unit 33 may be referred to as a wide area map.

Although the wide area map is not illustrated, the wide area map includes an area where no object is detected by the LiDAR 11 and it is determined that the ship 95 may be navigated, as in the local map 36.

The docking point setting unit 41 in FIG. 1 detects, from the local map 36, a candidate location for automatic docking of the ship 95. As illustrated in FIG. 2, on the local map 36, a group of points that are considered to represent docking facilities appears so as to line up in one direction in front of the occlusion area 38. Therefore, the docking point setting unit 41 uses an appropriate calculation algorithm to detect a straight line 39 along the group of points. The straight line 39 represents the direction of a docking facility.

Figure 3:
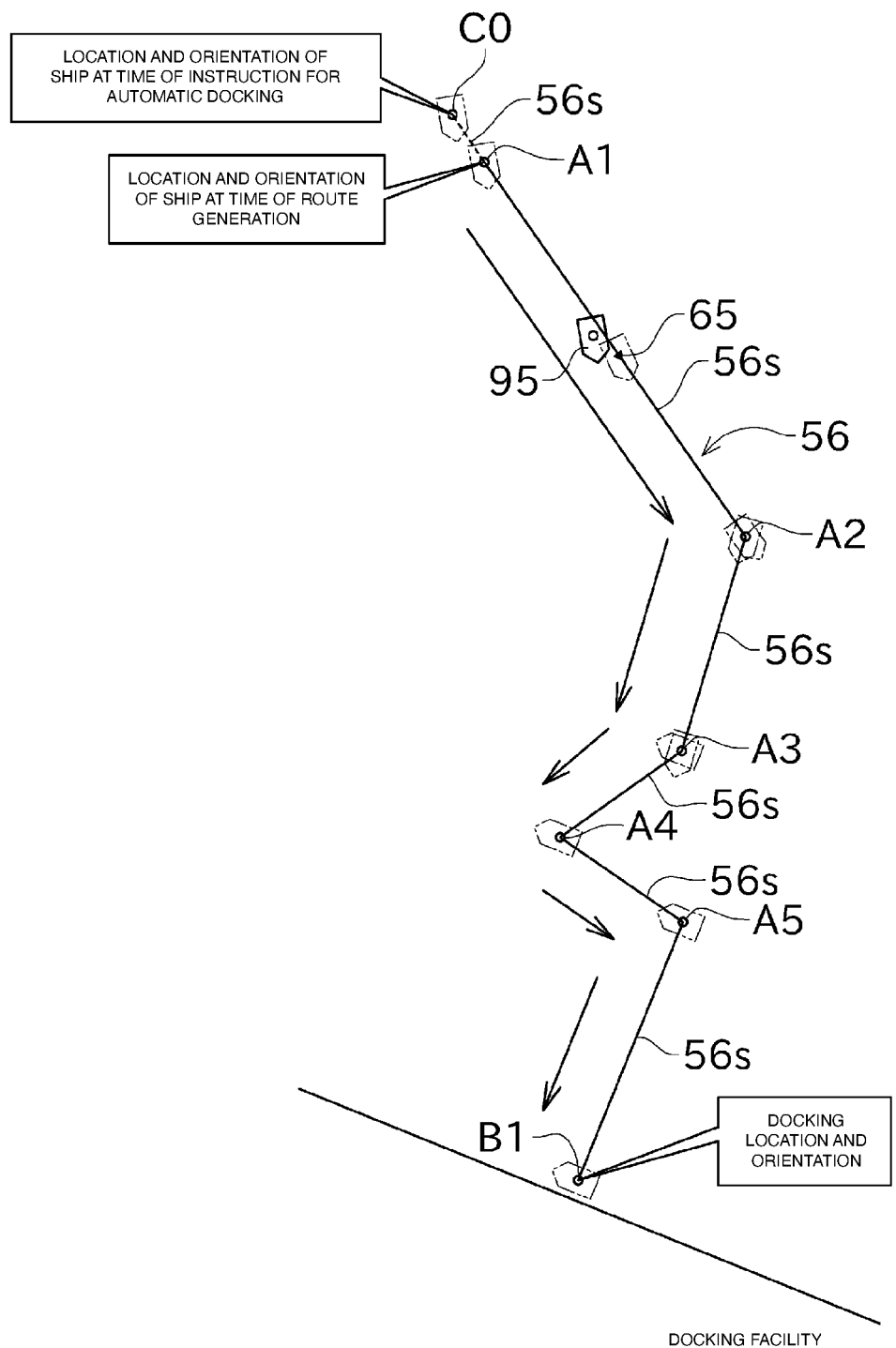
FIG. 3 is a schematic diagram illustrating how a ship changes its orientation while following waypoints of a route.

The user may set a target point (may be referred to as a docking point B1 in the following description) for the actual automatic docking of the ship 95 at a location near the straight line 39 detected by the docking point setting unit 41 via the interface unit 81 described below. The user sets the docking point B1 near the docking facility (specifically, the straight line 39) in which docking is considered to be possible in consideration of the entire length of the ship 95. FIG. 3 illustrates an example of the docking point B1, although the land form is different from that in the example of FIG. 2. The ship 95 is docked in a direction along the direction of the docking facility (the direction of the straight line 39). The user makes a selection as to which direction the bow is to be turned upon docking, in other words, whether the portside is to be brought into the dock or the bow side is to be brought into the dock.

The docking point B1 is provided with the information regarding the target location and the target orientation of the ship 95 at the docking location. Therefore, the docking point B1 substantially corresponds to the docking location of the ship 95.

Here, the target location is a target location for the automatically navigated ship 95. The target orientation is a target orientation for the automatically navigated ship 95. The target includes not only the final target (the docking point B1) but also an intermediate target before it.

The route generating unit 51 calculates the route for the ship 95 from the current location of the ship 95 to the docking point B1 based on an appropriate route search algorithm. This calculation of a route uses both the local map 36 generated by the local map generating unit 32 and the wide area map generated by the wide area map generating unit 33. After the calculation of a route is completed, the route generating unit 51 generates a plurality of waypoints A1, A2, . . . , defining a route 56, as illustrated in FIG. 3. The route generating unit 51 sets the information regarding the target location and the target orientation for each of the waypoints A1, A2, . . . . The target location and the target orientation of the waypoint A1 located at the start point of the route 56 match the location and the orientation of the ship 95 at the time when the generation of the route 56 is instructed. The end point of the route 56 is the docking point B1.

In the following description, the points, such as the waypoints A1, A2, . . . , and the docking point B1, where the ship 95 is controlled to obtain the target location and the target orientation at the corresponding point may be referred to as control points. The waypoints A1, A2, . . . are intermediate control points, and the docking point B1 is the final control point. The route 56 is defined in the shape of bent line segments so as to sequentially connect the target locations at the control points.

Each control point includes the information about a target location and a target orientation. For automatic docking, the control is performed such that the ship 95 sequentially obtains the target location and the target orientation at each control point in accordance with the order of the control points on the route 56.

The display data generating unit 71 in FIG. 1 may generate the display data for presenting the current location of the ship 95, the environment map, the docking location, etc. Further, a display example by the display data generating unit 71 is described below.

The interface unit 81 has a user interface function for the ship-steering control device 1. The interface unit 81 may be configured to include, for example, a display and an input device. In this case, the user may refer to the contents presented on the display and operate the input device to input an instruction. The input device may be a keyboard, a mouse, a touch panel, or the like.

The control target controller 4 generates an immediate control target for controlling the ship 95 so as to automatically navigate (automatically dock) the ship 95 along the route 56 generated by the route controller 2. Further, the detailed configuration of the control target controller 4 is described below.

The control controller 3 is a computer including a CPU, a ROM, and a RAM. The ROM stores a program for controlling the operation of the propulsion device 5 (the operation of the right and left screws 6L and 6R according to the present embodiment). The control controller 3 controls the propulsion device 5 in accordance with this program.

The ship 95 includes an operating device 91 for operating the ship 95. When the user operates the operating device 91, the operation content on the operating device 91 is output to the control controller 3. The control controller 3 controls the operation of the propulsion device 5 in accordance with the input operation content. Therefore, the user may operate the operating device 91 so as to manually navigate the ship 95. The operating device 91 may be, for example, a wheel, a control lever, a joystick, or the like.

When the route controller 2 generates the route 56, the control controller 3 controls the propulsion device 5 of the ship 95 so as to obtain the control target generated by the control target controller 4 (i.e., the target location and the target orientation to be obtained by the ship 95 for the meantime).

The control controller 3 is configured as a Dynamic Positioning system (DPS) that is a known system. DPS is a system that automatically controls a propulsion device against external forces such as tidal current, wave, or wind to automatically hold a ship in a predetermined location. Specifically, the control controller 3 calculates the thrust of the ship 95 necessary to eliminate the difference between the target location output by the control target controller 4 and the current location of the ship 95. Furthermore, the control controller 3 calculates the turning moment of the ship 95 necessary to eliminate the difference between the target orientation output by the control target controller 4 and the current orientation of the ship 95. Then, the control controller 3 gives an instruction to the propulsion device 5 so as to obtain the calculated thrust and turning moment. The control controller 3 repeats the above processing.

Although the details are described below, each time the ship 95 obtains the target location and the target orientation output by the control target controller 4, the control target controller 4 updates the target location and the target orientation output to the control controller 3 in accordance with the route 56. Thus, the ship 95 may be automatically navigated.

Next, the configuration of the control target controller 4 is described in detail. The control target controller 4 includes a transit target point generating unit 61, an arrival determining unit 62, and a display data generating unit 63.

Specifically, the control target controller 4 is configured as a computer including a CPU, a ROM, and a RAM. The ROM stores a program for operating the control target controller 4. The cooperation of the above-described hardware and software may cause the control target controller 4 to function as the transit target point generating unit 61, the arrival determining unit 62, and the display data generating unit 63.

The transit target point generating unit 61 generates a transit target point 65 on the route 56 generated by the route controller 2 (the route generating unit 51). FIG. 3 illustrates an example of the transit target point 65. The transit target point 65 has the information on the target location and the target orientation, as is the case with the waypoints A1, A2, . . . , and the docking point B1.

Here, the route 56 is defined in the shape of bent line segments so as to sequentially connect the target locations at the control points (the waypoints A1, A2, . . . , and the docking point B1). The route 56 is divided by the target location (i.e., the vertex of the bent line segments) at each of the control points to obtain a plurality of partial routes 56s. The partial routes 56s are arranged so as to sequentially connect the target locations at the control points.

The transit target point generating unit 61 sets the target location of the transit target point 65 so as to be located at the start point, the end point, or in the middle of one of the partial routes 56s. When the target location of the transit target point 65 is set to internally divide the partial route 56s, the target orientation of the transit target point 65 is set to be an orientation between the target orientation of the control point at the start point of the partial route 56s and the target orientation of the control point at the end point of the partial route 56s in accordance with the internal division ratio.

The control target controller 4 outputs, as a control target, the target location and the target orientation of the transit target point 65 generated by the transit target point generating unit 61 to the control controller 3 in FIG. 1. Further, the transit target point generating unit 61 outputs the target location and the target orientation of the generated transit target point 65 to the arrival determining unit 62 and the display data generating unit 63.

The arrival determining unit 62 determines whether the ship 95 has obtained the target location and the target orientation of the transit target point 65 based on the current location and the current orientation of the ship 95. The current location of the ship 95 may be acquired from the GNSS device 12. The current orientation of the ship 95 may be acquired from the orientation sensor 13. The arrival determining unit 62 outputs the above-described determination result to the transit target point generating unit 61.

The display data generating unit 63 may generate the display data for displaying the target location and the target orientation of the transit target point 65. Further, a display example by the display data generating unit 63 is described below.

Figure 4:
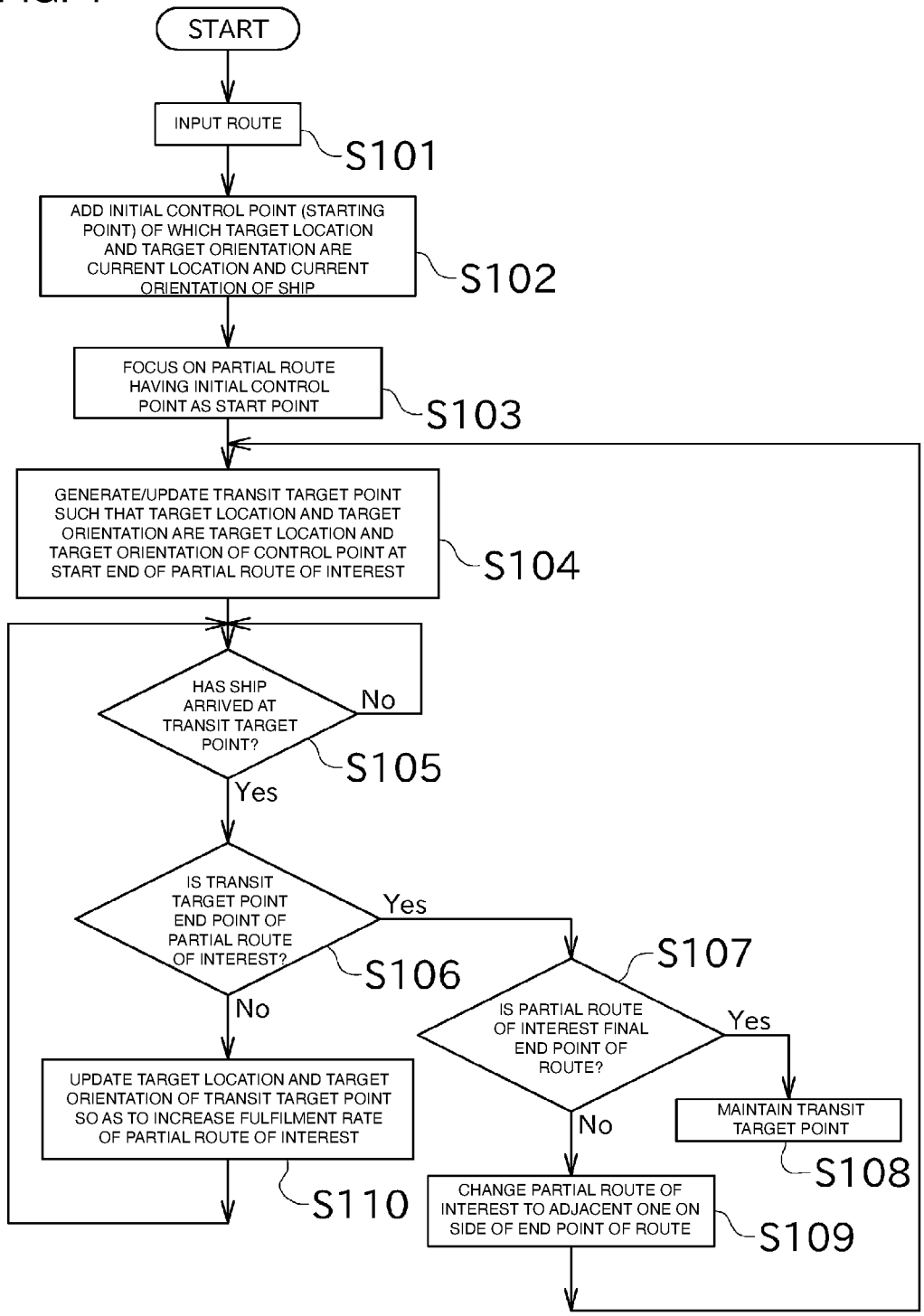
FIG. 4 is a flowchart illustrating a process performed by a control target controller to generate a control target.

Next, a process of the control target controller 4 is described. FIG. 4 is a flowchart illustrating the process during which the control target controller 4 generates a control target.

When the user inputs the instruction for starting automatic docking via the interface unit 81, the control target controller 4 starts the process in FIG. 4.

The control target controller 4 first acquires the route 56 for the ship 95 output by the route controller 2 (the route generating unit 51) (Step S101).

Subsequently, the control target controller 4 adds a starting point C0, which is one type of control point, to the route 56 (Step S102). The target location at the starting point C0 is the current location of the ship 95, and the target orientation is the current orientation of the ship 95. Thus, the initial partial route 56s is substantially generated. In FIG. 3, and the like, the partial route 56s having the starting point CO as a start point and the waypoint A1 as an end point is illustrated in a broken line.

Specifically, there is a slight time difference between the time when the route generating unit 51 generates the route 56 and the time when the automatic docking starts, and there may be a mismatch in the location and the orientation of the ship 95 due to the effect of the tidal current, etc. Even in this case, the process to add the starting point CO to the route 56 may cause the ship 95 to smoothly move to the starting point (the waypoint A1) of the original route 56.

Subsequently, the transit target point generating unit 61 sets, as the partial route 56s of interest, the partial route 56s having the control point (the starting point CO) added at Step S102 as a start point (Step S103 in FIG. 4).

Subsequently, the transit target point generating unit 61 generates the transit target point 65 (Step S104). Here, the target location of the transit target point 65 matches the target location of the control point at the start point of the partial route 56s of interest, and the target orientation of the transit target point 65 matches the target orientation of the control point at the start point.

Subsequently, the arrival determining unit 62 determines whether the ship 95 has arrived at the transit target point 65 based on a predetermined condition (Step S105). Although this condition is described in detail below, it is basically based on whether the current location and the current orientation of the ship 95 illustrated in FIG. 5 substantially match the target location and the target orientation of the transit target point 65. The control target controller 4 repeats the determination at Step S105 of FIG. 4 until the arrival determining unit 62 determines that the ship 95 has arrived at the transit target point 65.

When the arrival determining unit 62 determines that the ship 95 has arrived at the transit target point 65 during the determination at Step S105, the transit target point generating unit 61 determines whether the transit target point 65 matches the end point of the partial route 56s of interest (Step S106).

When the transit target point 65 matches the end pint of the partial route 56s of interest, the control target controller 4 determines whether the partial route 56s of interest is the final end point of the route 56 (Step S107). When the partial route 56s of interest is the final end point of the route 56, it means that the ship 95 has docked at the docking point B1 after passing through the entire route 56. In this case, the target location and the target orientation of the transit target point 65 are maintained so as to match the target location and the target orientation at the docking point B1 (Step S108). Thus, the ship 95 is maintained at the location and the orientation at the docking point B1 set by the user.

When the partial route 56s of interest is not the final end point of the route 56 during the determination at Step S107, the partial route 56s of interest is changed to the adjacent partial route 56s on the side closer to the end point (the docking point B1) of the route 56 with respect to the partial route 56s of interest (Step S109). Then, the process returns to Step S104.

When the transit target point 65 does not match the end point of the partial route 56s of interest during the determination at Step S106, the transit target point generating unit 61 updates the transit target point 65 so as to increase the fulfillment rate of the corresponding partial route 56s (Step S110). In other words, the target location of the transit target point 65 is changed to be closer to the target location of the control point at the end point of the partial route 56s, and the target orientation is changed to be closer to the target orientation of the control point at the end point thereof. The details of this update process are described below. Then, the process returns to Step S105.

Subsequently, the determination of the arrival of the ship 95 at the transit target point 65 performed at Step S105 is described in detail. "Arrival" means that the ship 95 has achieved the target indicated by the transit target point 65 in terms of at least the location and the orientation.

According to the present embodiment, the arrival determining unit 62 determines that the ship 95 has arrived at the transit target point 65 when all of the following three conditions are satisfied. A first condition is that the deviation (a distance D1 in FIG. 5) between the target location of the transit target point 65 and the current location of the ship 95 is less than a predetermined threshold. A second condition is that the deviation (an angle θ) between the target orientation of the transit target point 65 and the current orientation of the ship 95 is less than a predetermined threshold. A third condition is that a distance D2 between the partial route 56s of interest and the current location of the ship 95 is less than a predetermined threshold.

Thus, according to the present embodiment, the arrival determination is made in consideration of whether the current location of the ship 95 is close to the target location of the transit target point 65 and whether it is close to the partial route 56s. Thus, it is possible to perform control such that it is ensured that the ship 95 moves along the partial route 56s.

According to the present embodiment, thresholds (a loose threshold, an intermediate threshold, and a tight threshold) at three steps are prepared for each of the above-described three conditions. Further, for the determination made by the arrival determining unit 62, a loose threshold is adopted when there is a long distance from the docking point B1, which is the end point of the route 56, and a tight threshold is adopted when there is a short distance from the docking point B1. When the distance from the docking point B1 is neither long nor short, an intermediate threshold is adopted. Therefore, the arrival of the ship 95 at the transit target point 65 is loosely determined when there is a long distance from the docking point B1, and the arrival of the ship 95 at the transit target point 65 is tightly determined when there is a short distance from the docking point B1. Accordingly, the ship 95 may be controlled with particular accuracy at the end of the automatic docking close to the docking point B1. According to the present embodiment, the necessary distance (hereinafter sometimes referred to as route distance) from the docking point B1 to the transit target point 65 along the route 56 is used as the distance from the docking point B1, which is the reference for selecting the threshold. Instead, the threshold may be selected in accordance with the straight distance from the docking point B1.

Furthermore, as in the partial route 56s between a waypoint A3 and a waypoint A4 in FIG. 3, the orientation of the route 56 sometimes changes largely at the end point of the partial route 56s. In such a case, when the target location of the transit target point 65 is close to the end point, the arrival determining unit 62 uses the tight threshold out of the thresholds at three steps to make an arrival determination regardless of the distance from the docking point B1. It may be determined whether the target location of the transit target point 65 is close to the end point of the partial route 56s based on whether the distance between the two is less than a threshold or based on whether the rate (the unfulfillment rate in terms of a distance) obtained by dividing the corresponding distance by the distance of the partial route 56s is less than a threshold. Accordingly, the strict control is performed immediately before the control point where the orientation changes largely, and therefore the ship 95 may be effectively prevented from deviating from the route 56 due to inertia, etc.

Next, the update process of the transit target point 65 performed at Step S110 is described in detail.

When the arrival determining unit 62 determines that the ship 95 has arrived at the transit target point 65, the transit target point generating unit 61 updates the target location and the target orientation of the transit target point 65. With regard to how much the target location and the target orientation are changed by a single update, the amounts of update change in three steps (a large amount of update change, an intermediate amount of update change, and a small amount of update change) are prepared for each target location and target orientation. According to the present embodiment, as the flow in FIG. 4 is executed such that the loop cycle of Steps S104 to S110 is constant, the amounts of update change substantially mean the amounts of update change per unit time (in other words, the rate of change). When it is assumed that the time from when the target location and the target orientation are updated to when the updated target location and target orientation are obtained is constant, the rate of change of the target location and the target orientation is constant unless the amount of update change is switched.

To update the transit target point 65, a large amount of update change is used when there is a long distance from the docking point B1, which is the end point of the route 56, and a small amount of update change is used when there is a short distance from the docking point B1. When the distance from the docking point B1 is neither long nor short, the intermediate amount of update change is used. Therefore, the transit target point 65 is roughly updated when there is a long distance from the docking point B1, and the transit target point 65 is finely updated when there is a short distance from the docking point B1. Finely updating the transit target point 65 means finely determining the arrival by the arrival determining unit 62. Thus, it is possible to control the ship 95 with particular precision at the end of the automatic docking close to the docking point B1. According to the present embodiment, the route distance is used as the distance from the docking point B1 that serves as a reference for selecting the threshold. Instead, the threshold may be selected in accordance with the straight distance from the docking point B1.

Furthermore, when the orientation of the route 56 changes largely at the end point of the partial route 56s and the target location of the transit target point 65 is close to the end point, the transit target point generating unit 61 updates the transit target point 65 by the small amount of update change among the amounts of update change in three steps regardless of the distance from the docking point B1. It may be determined whether the target location of the transit target point 65 is close to the end point of the partial route 56s based on whether the distance between the two is less than a threshold or based on whether the above-described unfulfillment rate is less than a threshold. Accordingly, the transit target point 65 is finely changed immediately before the control point where the orientation changes largely, and therefore the ship 95 may be effectively prevented from deviating from the route 56 due to inertia, etc.

Further, on a part of the route 56 on the side close to the start point (the starting point C0 or the waypoint A1), the amount of change in the target location and the target orientation by a single update to the transit target point 65 is kept constant at the above-described large amount of update change. Therefore, the stable navigation of the ship 95 may be achieved.

Figure 5:
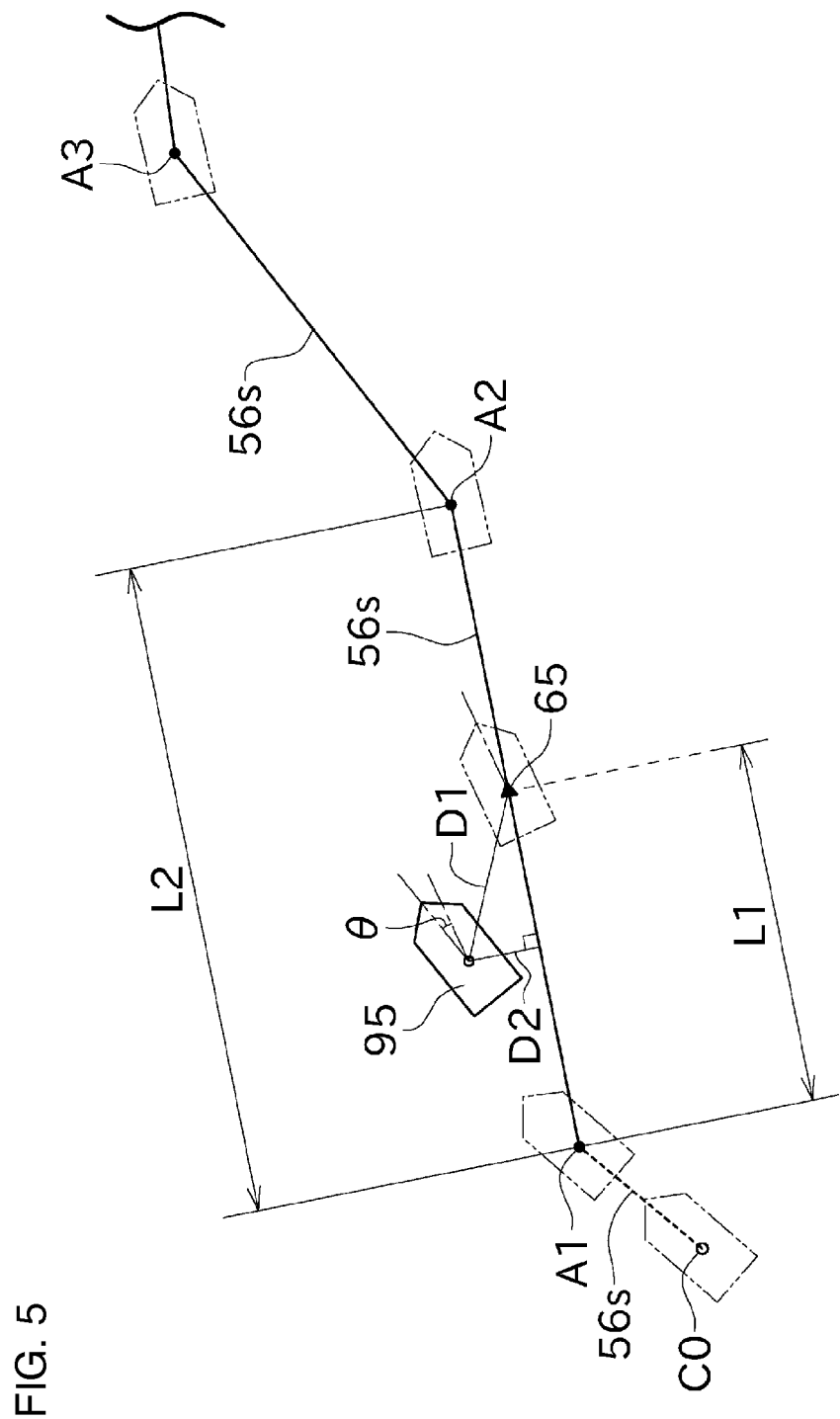
FIG. 5 is a schematic diagram illustrating a transit target point and an arrival determination.

The transit target point generating unit 61 uses an internal division ratio to calculate the target location and the target orientation of the transit target point 65. In the example of FIG. 5, when the partial route 56s of interest is a line segment from the waypoint A1 to the waypoint A2, the internal division ratio is a ratio of a distance L1 from the start point of the partial route 56s of interest to the transit target point 65 to a distance L2 from the start point to the end point. The internal division ratio is a value equal to or more than 0 or equal to or less than 1. In the example of FIG. 5, the internal division ratio is approximately 0.55. Furthermore, the above-described unfulfillment rate is obtained by subtracting the internal division ratio from 1.

To update the target location and the target orientation of the transit target point 65, the transit target point generating unit 61 calculates how much the internal division ratio is to be increased by the current update.

The amount of increase in the internal division ratio by a single update in terms of the target location may be obtained by dividing the amount of update change in the location by the difference between the target locations of the two control points located at the ends of the partial route 56s of interest (in other words, the distance L1 of the partial route 56s of interest). For example, when the distance between the target location of the waypoint A1 and the target location of the waypoint A2 is 5 meters and the amount of update change in the location is 1 meter at a time, the amount of increase in the internal division ratio is 0.2.

The amount of increase in the internal division ratio by a single update in terms of the target orientation may be obtained by dividing the amount of update change in the orientation by the difference between the target orientations of the two control points located at the ends of the partial route 56s of interest. For example, when the difference between the target orientation of the waypoint A1 and the target orientation of the waypoint A2 is 15° and the amount of update change in the orientation is 1.5° at a time, the amount of increase in the internal division ratio is 0.1.

The transit target point generating unit 61 performs calculation to acquire the amount of increase in the internal division ratio in the two terms and then uses the smaller one of the two values to make an addition to the internal division ratio. The reason why a smaller value is used is to avoid unbalance of changes in the location and the orientation. When the internal division ratio after the addition exceeds one, it is corrected to be one. According to the above-described example, the internal division ratio after the addition is 0.65.

After a new internal division ratio is obtained, the transit target point generating unit 61 updates the target location so as to obtain the location corresponding to the internal division ratio after the addition in the range between the target locations of the two control points (in the example of FIG. 5, the waypoint A1 and the waypoint A2) located at the ends of the partial route 56s of interest. Similarly, the transit target point generating unit 61 updates the target orientation so as to obtain the orientation corresponding to the internal division ratio after the addition in the range between the target orientations of the two control points (the waypoint A1 and the waypoint A2) located at the ends of the partial route 56s of interest.

When the internal division ratio is 1, the target location and the target orientation of the updated transit target point 65 match the target location and the target orientation of the control point located at the end point of the partial route 56s of interest.

The cooperative operation of the control target controller 4 and the control controller 3 causes the ship 95 to, in principle, move so as to follow the transit target point 65 that moves ahead in the partial route 56s. However, for example, when the ship 95 temporarily deviates from the route 56 for some reason and then returns, it is possible that the actual location of the ship 95 precedes the target location of the transit target point 65. Hereinafter, such a case may be referred to as "overtaking".

Figure 6:
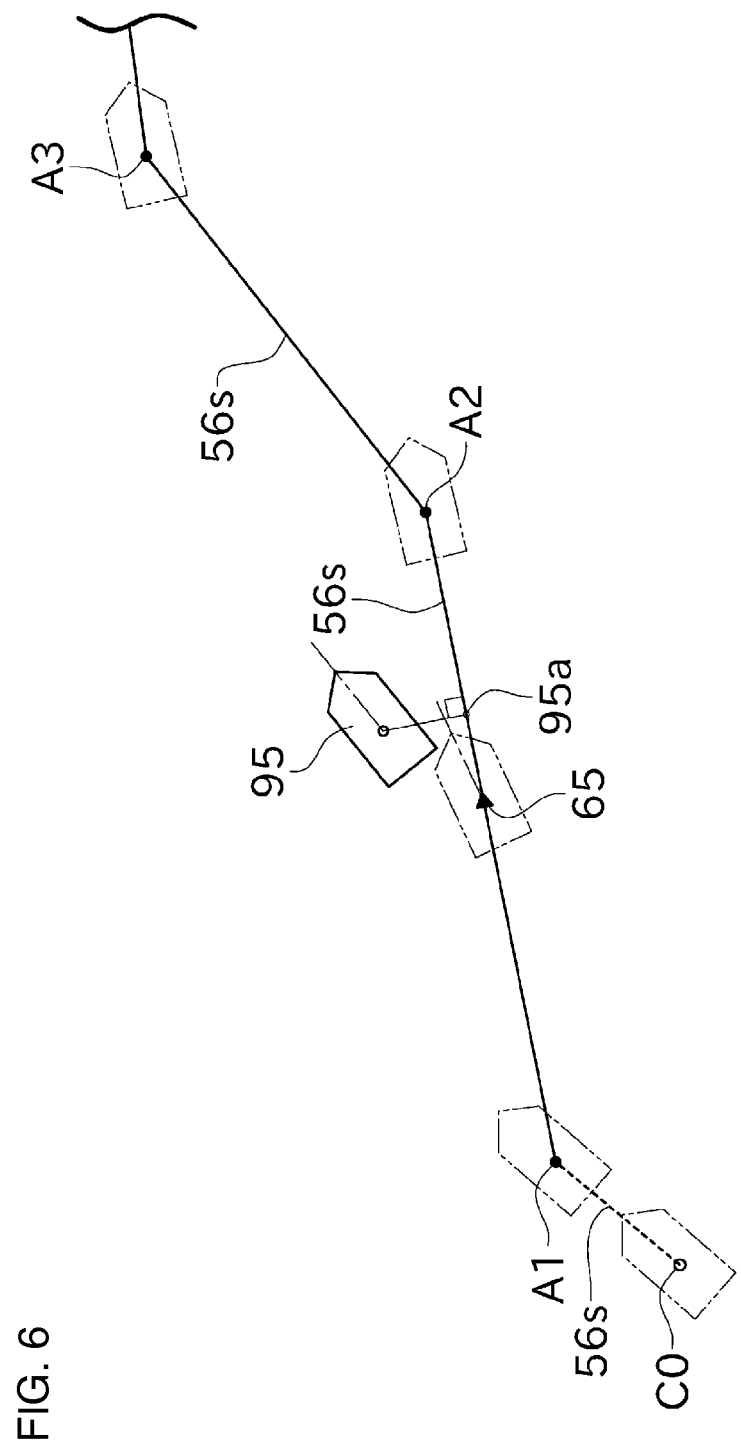
FIG. 6 is a schematic diagram that describes a case where the location of a ship precedes a target location of a transit target point.

The arrival determining unit 62 may determine whether the location of the ship 95 precedes the target location of the transit target point 65 as described above. Specifically, as illustrated in FIG. 6, the arrival determining unit 62 calculates an intersection 95a where the partial route 56s of interest intersects with the vertical line segment drawn from the current location of the ship 95 to the partial route 56s. The intersection 95a corresponds to, in the partial route 56s of interest, the point closest to the current location of the ship 95. Subsequently, the arrival determining unit 62 compares the obtained intersection 95a with the target location of the transit target point 65. When the above-described intersection 95a is closer to the end point of the partial route 56s of interest with respect to the target location of the transit target point 65, it is determined that there has been overtaking.

Although not illustrated in the flow of FIG. 4, when the ship 95 has not arrived at the transit target point 65 as a result of the arrival determination made at Step S105, the arrival determining unit 62 determines whether there has been the above-described overtaking. Then, when the arrival determining unit 62 determines that there has been overtaking, the control target controller 4 considers that the ship 95 has arrived at the transit target point 65 and performs processes at Step S106, Step S110, and the like. Accordingly, the transit target point generating unit 61 repeatedly updates the target location and the target orientation of the transit target point 65 so as to follow the current location of the ship 95 until the overtaking state is eliminated. Thus, it is possible to prevent the ship 95 from being navigated in the opposite direction and to perform the automatic docking in a smooth manner.

However, even if the current location of the ship 95 precedes the target location of the transit target point 65, the arrival determining unit 62 does not consider that the ship 95 has arrived at the transit target point 65 when the difference between the current orientation of the ship 95 and the target orientation of the transit target point 65 is more than a predetermined threshold. In this case, the control target controller 4 does not perform the process to update the transit target point 65, and the control controller 3 navigates the ship 95 so as to return to the transit target point 65. As the ship 95 arrives at the transit target point 65, overtaking is substantially eliminated. Thus, the accuracy of the control regarding the orientation of the ship 95 may be ensured.

Next, the display of the transit target point 65, and the like, is described.

The display data generating unit 71 included in the route controller 2 of FIG. 1 may generate the display data indicating the situation around the ship 95. The display data generating unit 63 included in the control target controller 4 may generate the display data regarding the transit target point 65 of the ship 95. With the display data, for example, a display included in the interface unit 81 may present various types of information.

Figure 7:
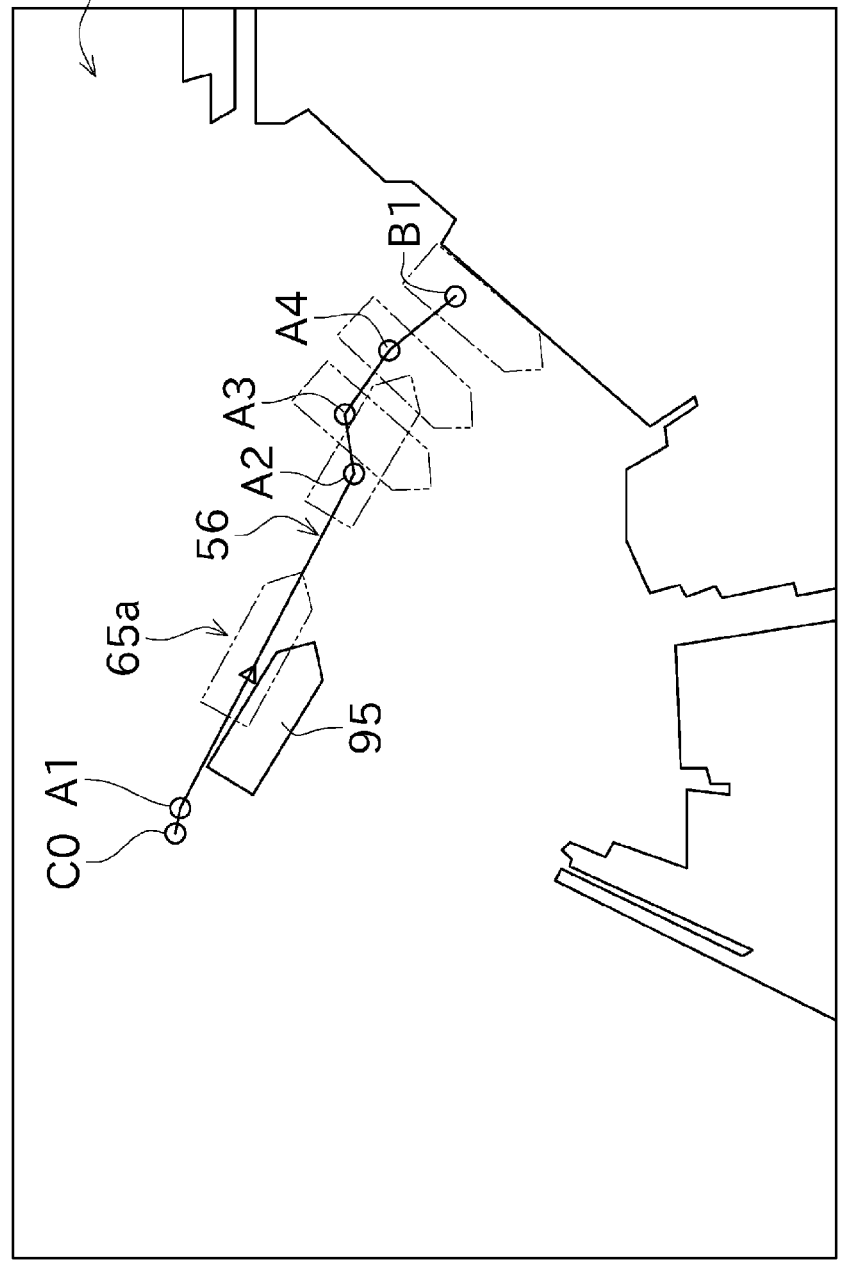
FIG. 7 is a diagram illustrating an example of display content on a display based on display data.

FIG. 7 illustrates an example of a screen displayed by display data 75 of the display data generating unit 71. The display data 75 may be, for example, the data for indicating the current location of the ship 95 with a symbol figure, indicating the route 56 in bent line segments, and indicating, in a graphic form, the location and the orientation to be obtained by the ship at each of the waypoints A1, A2, . . . , and the docking point B1.

As illustrated in FIG. 7, display data 64 generated by the display data generating unit 63 includes the data for displaying the location and the orientation to be obtained by the ship 95 at the transit target point 65 with a FIG. 65a. This allows the user looking at the image on the display to easily understand in advance how the ship 95 is currently controlled.

As described above, the control target controller 4 according to the present embodiment generates the control target for controlling the location and the orientation of the ship 95 in accordance with the route 56. The route 56 includes a plurality of control points (the waypoints A1, A2, . . . , and the docking point B1). Each of the control points has the information about the target location and the target orientation of the ship 95. The route 56 is formed by the partial routes 56s that sequentially connect the target locations of the control points. The control target controller 4 includes the transit target point generating unit 61 and the arrival determining unit 62. The transit target point generating unit 61 may generate the transit target point 65 having the information about the target location and the target orientation of the ship 95 as a control target in an intermediate position of the partial route 56s. The arrival determining unit 62 determines whether the ship 95 has arrived at the transit target point 65 based on the current location and the current orientation of the ship 95.

Accordingly, an intermediate control target regarding the location and the orientation of the ship 95 may be generated as the transit target point 65 between the control points of the route 56, and the arrival at the transit target point 65 may be determined. Thus, the ship 95 may be accurately navigated between the control points in accordance with the route 56.

Further, in the control target controller 4 according to the present embodiment, when the arrival determining unit 62 determines that the ship 95 has arrived at the transit target point 65, the transit target point generating unit 61 updates the transit target point 65. When the transit target point 65 is updated, the target location and the target orientation of the transit target point 65 are changed so as to approach the target location and the target orientation of the control point at the end point of the partial route 56s.

Thus, as the transit target point 65 is updated under the condition that the ship 95 has arrived at the transit target point 65, it is possible to ensure that the location and the orientation of the ship 95 are sequentially controlled in each of divided steps between the control points.

Furthermore, according to the present embodiment, the magnitude of change in the target location and the target orientation of the transit target point 65 by each update is constant in a part of the route 56 on the starting point side. Thus, the stable navigation of the ship 95 may be achieved.

Furthermore, for the control target controller 4 according to the present embodiment, the end point of the route 56 is the docking point B1 at which the ship 95 is docked. The change in the target location and the target location of the transit target point 65 by each update becomes smaller as the distance from the docking point B1 becomes smaller.

Thus, as the distance from the docking point B1 becomes smaller, the control regarding the location of the ship 95, and the like, may be performed in a more detailed manner. As a result, particularly accurate control may be performed at the final stage of the automatic docking.

Furthermore, in the control target controller 4 according to the present embodiment, in a case where the magnitude of change in the orientation of the route 56 at the end point of the partial route 56s is more than a predetermined value, the change in the target location and the target orientation of the transit target point 65 by each update is small when the transit target point 65 is close to the end point of the partial route 56s.

Thus, in a case where the orientation of the route 56 largely changes at a certain control point, fine control is performed when the distance to the control point is short so that the actual movement trajectory of the ship 95 may be prevented from deviating from the route 56.

Further, in the control target controller 4 according to the present embodiment, the arrival determining unit 62 determines whether the ship 95 has arrived at the transit target point 65 in consideration of the distance D2 between the partial route 56s and the current location of the ship 95.

Therefore, the arrival determination may be made in consideration of whether the current location of the ship 95 is sufficiently close to the partial route 56s. Thus, it is possible to perform control such that it is ensured that the ship 95 moves along the partial route 56s.

Furthermore, for the control target controller 4 according to the present embodiment, the end point of the route 56 is the docking point B1 at which the ship 95 is docked. The arrival determining unit 62 determines whether the ship 95 has arrived at the transit target point 65 more strictly as the distance from the docking point B1 becomes shorter.

Thus, particularly accurate control may be performed on the location and the orientation of the ship 95 at the final stage of the automatic docking.

Further, in the control target controller 4 according to the present embodiment, when the magnitude of change in the orientation of the route 56 at the end point of the partial route 56s is more than a predetermined value and the transit target point 65 is close to the end point, the arrival determining unit 62 strictly determines whether the ship 95 has arrived.

Thus, in a case where the orientation of the route 56 changes largely at a certain control point, and when the distance to the control point is short, particularly accurate control is performed on the location and the orientation of the ship 95 so that the actual movement trajectory of the ship 95 may be prevented from deviating from the route 56.

Furthermore, in the control target controller 4 according to the present embodiment, the arrival determining unit 62 may determine whether the current location of the ship 95 precedes the target location of the transit target point 65 in the partial route 56s. When the arrival determining unit 62 determines that the current location of the ship 95 precedes, the transit target point generating unit 61 updates the transit target point 65 so as to change the target location and the target orientation.

This may reduce the navigation of the ship 95 in an opposite direction.

Furthermore, in the control target controller 4 according to the present embodiment, when the arrival determining unit 62 determines that the current ship 95 of the ship 95 precedes, the transit target point generating unit 61 updates the transit target point 65 under the condition that the difference between the current ship 95 of the ship 95 and the target orientation of the transit target point 65 falls within a predetermined range.

Thus, the accuracy of control on the orientation of the ship 95 may be ensured.

The control target controller 4 according to the present embodiment includes the display data generating unit 63 that generates the display data 64 for displaying the target location and the target orientation of the transit target point 65 in a graphic form.

This allows the user looking at the display to easily understand how the ship 95 is currently controlled between the control points.

Further, the ship-steering control device 1 according to the present embodiment includes the control target controller 4 and the control controller 3. The control controller 3 controls the propulsion device 5 of the ship 95 such that the current location of the ship 95 becomes closer to the target location of the control target and the current orientation of the ship 95 becomes closer to the target orientation of the control target.

Thus, the ship 95 may be automatically and accurately navigated between the control points in accordance with the route.

Figure 8:
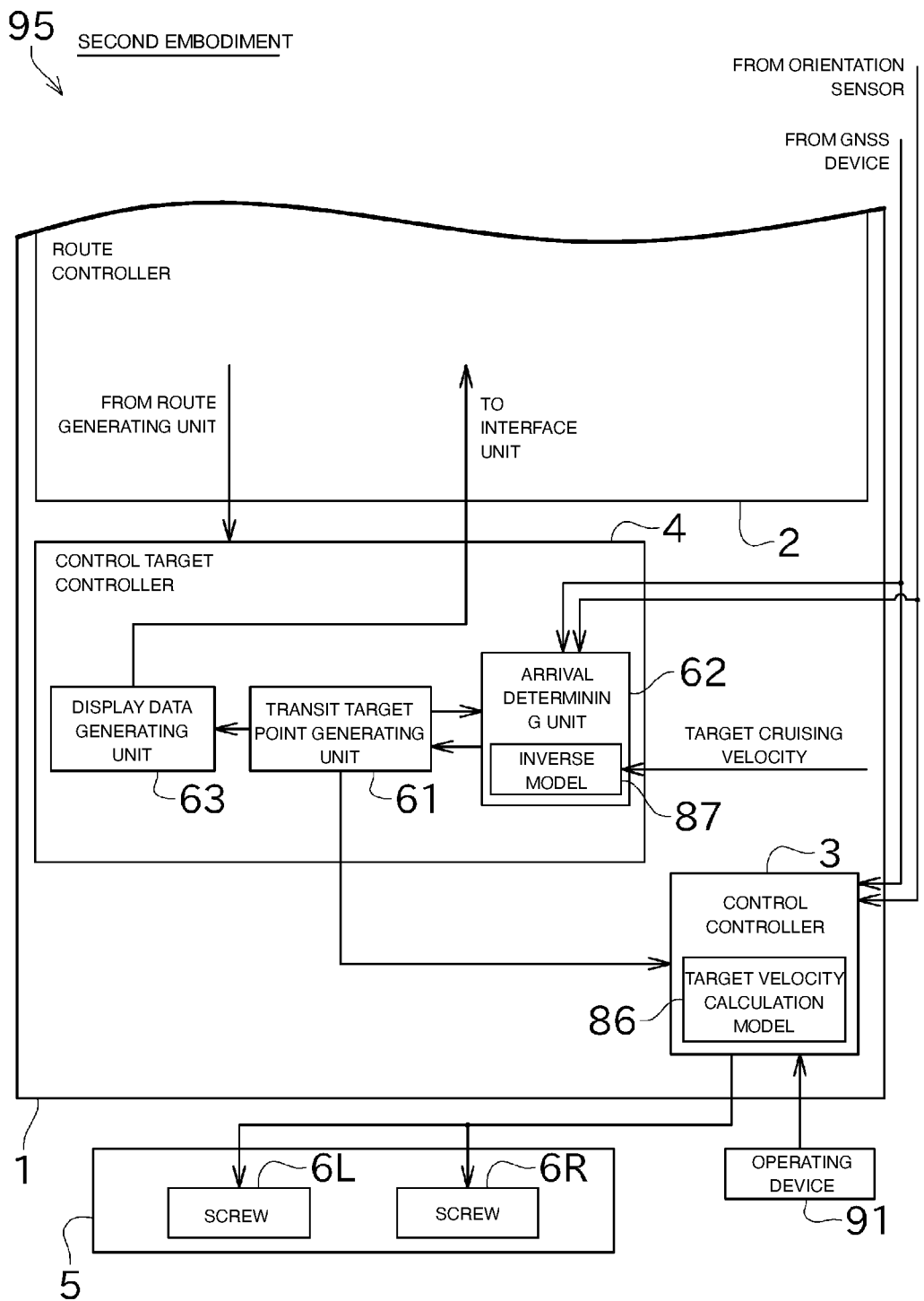
FIG. 8 is a block diagram illustrating a part of an electrical configuration of the ship-steering control device according to a second embodiment.

Next, a second embodiment is described. FIG. 8 is a block diagram illustrating a part of the electrical configuration of the ship-steering control device 1 according to the second embodiment. In the description of the second and subsequent embodiments, the same or similar configuration as that in the above-described first embodiment may be denoted by the same reference numeral as that in the first embodiment, and the description thereof may be omitted.

According to the first embodiment described above, the control controller 3 calculates the thrust of the ship 95 necessary to eliminate the difference between the target location output by the control target controller 4 and the current location of the ship 95. According to the first embodiment, the control is not performed to bring the velocity of the ship 95 closer to the target velocity (in other words, the target velocity of the ship is zero when it arrives at the target location). Therefore, it is difficult to navigate the ship 95 along the route 56 while the velocity is controlled as appropriate, and it is difficult to meet the needs for automatic navigation at a high velocity.

In this regard, in the ship-steering control device 1 according to the present embodiment illustrated in FIG. 8, the control controller 3 sets the target velocity of the ship 95 as appropriate in accordance with the deviation (hereinafter sometimes referred to as location deviation) between the target location input from the control target controller 4 and the current location of the ship 95. The orientation at the target velocity is set so as to move from the current location to the target location. Furthermore, the target velocity is defined in, for example, the form of a function so that it becomes higher as the location deviation increases. Further, the control controller 3 calculates the thrust of the ship 95 necessary to eliminate the difference between the target velocity of the ship 95, which is set as described above, and the current velocity of the ship 95. Moreover, the control controller 3 calculates the turning moment by the same method as that in the above-described first embodiment so as to bring the current orientation of the ship 95 closer to the target orientation. Then, the control controller 3 gives an instruction to the propulsion device 5 so as to obtain the calculated thrust and turning moment.

The control controller 3 includes a target velocity calculation model 86. The target velocity calculation model 86 is used to determine the magnitude of the target velocity of the ship 95 from the above-described location deviation. When the calculation model is expressed by a function f, Equation (1) below holds, where the magnitude of location deviation is L and the target velocity is Vt.

$$Vt = f(L) \tag{1}$$

Furthermore, according to the present embodiment, the arrival determining unit 62 includes an inverse model 87 of the above-described target velocity calculation model 86. With regard to the inverse model 87, Equation (2) below holds by using the inverse function of the above-described function f.

$$L = f^{-1}(Vt) \tag{2}$$

A target cruising velocity set by an appropriate method is input to the arrival determining unit 62. The target cruising velocity is set by the user via, for example, the interface unit 81. The arrival determining unit 62 inputs the magnitude of the target cruising velocity into the above-described inverse model 87 to obtain the location deviation corresponding to the target cruising velocity.

According to the present embodiment, the arrival determining unit 62 determines that the ship 95 has arrived at the transit target point 65 when both of the two conditions described below are satisfied. A first condition is that the deviation (the distance D1 in FIG. 5) between the target location of the transit target point 65 and the current location of the ship 95 is less than a predetermined threshold. A second condition is that the deviation (the angle θ) between the target orientation of the transit target point 65 and the current orientation of the ship 95 is less than a predetermined threshold. Furthermore, the location deviation output by the inverse model 87 is used as the threshold for the above-described first condition.

With this configuration, when the target cruising velocity is high, the location condition for the arrival determination is mild as compared with a case where it is low. Thus, the ship 95 may be navigated along the route 56 while the velocity is controlled as appropriate and the location and the orientation of the ship 95 are finely controlled.

The above-described first condition has the same meaning as the current location of the ship 95 being on or inside the circle centered on the target location of the transit target point 65 and having a predetermined size. Hereinafter, this circle may be referred to as an arrival range circle. The above-described inverse model 87 substantially obtains the size of the arrival range circle.

As described above, in the ship-steering control device 1 according to the present embodiment, the control controller 3 sets the target velocity of the ship 95 based on the location deviation that is the deviation between the target location input from the control target controller 4 and the current location of the ship 95. The control controller 3 controls the propulsion device 5 of the ship 95 such that the current velocity of the ship 95 becomes closer to the target velocity of the ship 95. The control controller 3 includes the target velocity calculation model 86 for determining the magnitude of the target velocity of the ship 95 based on the above-described location deviation. The arrival determining unit 62 determines that the ship 95 has arrived at the target location when the distance D1 between the target location and the current location of the ship 95 is less than the threshold. The arrival determining unit 62 includes the inverse model 87 of the target velocity calculation model 86. The arrival determining unit 62 obtains the location deviation corresponding to the magnitude of the target cruising velocity from the inverse model 87 and, based on the obtained location deviation, sets the threshold regarding the distance between the target location and the current location of the ship 95.

Thus, setting a high target cruising velocity enables the automatic navigation at a high velocity.

Figure 9:
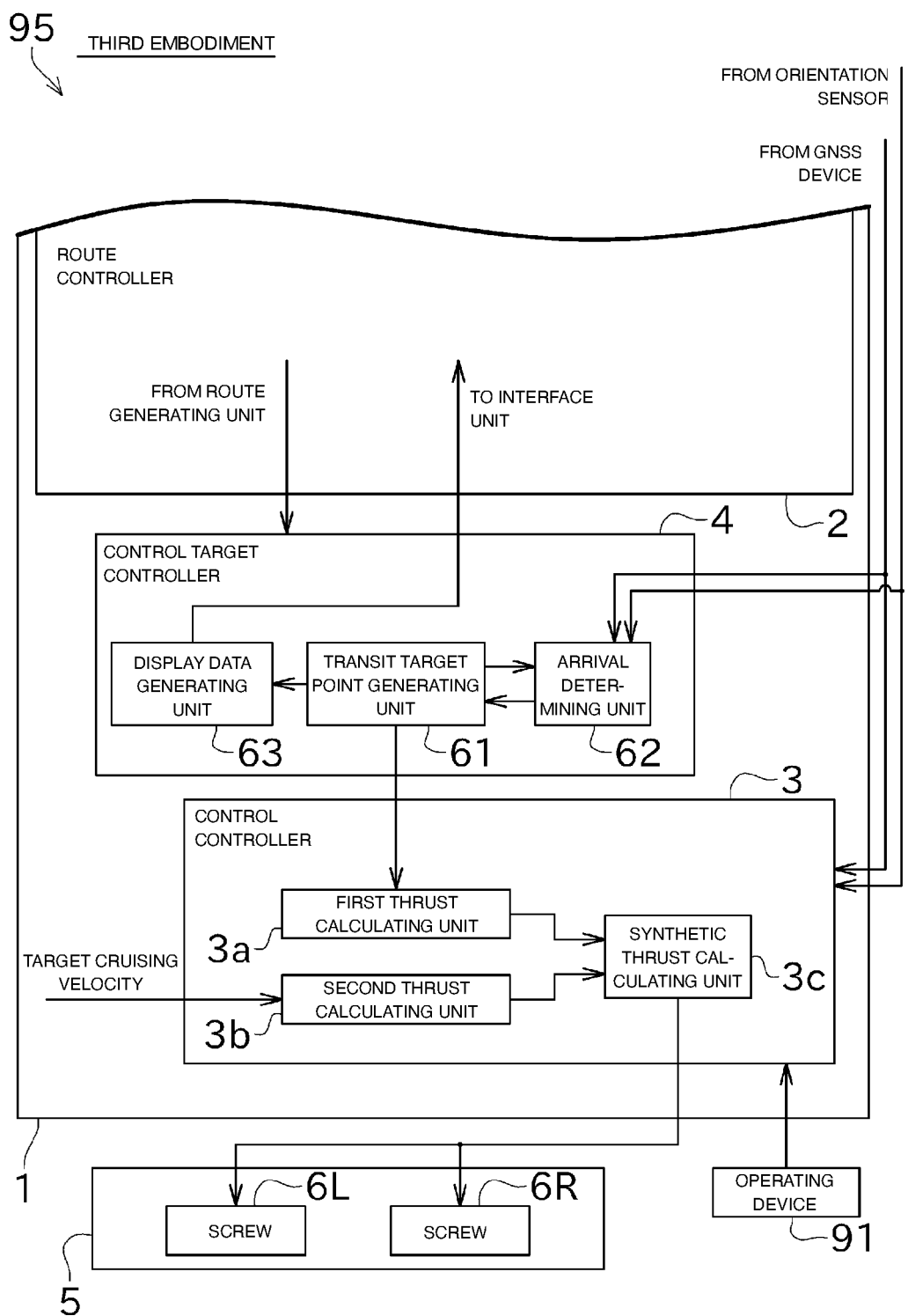
FIG. 9 is a block diagram illustrating a part of an electrical configuration of the ship-steering control device according to a third embodiment.
Figure 10:
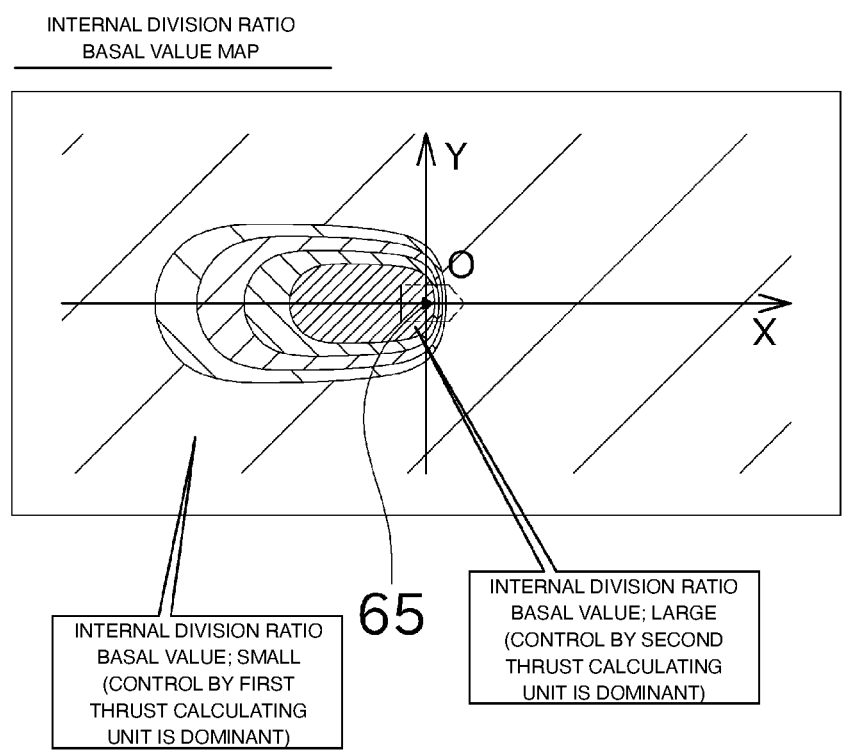
FIG. 10 is a schematic diagram that describes an internal division ratio basal value map used according to the third embodiment.

Next, a third embodiment is described. FIG. 9 is a block diagram illustrating a part of the electrical configuration of the ship-steering control device 1 according to the third embodiment. FIG. 10 is a schematic diagram that describes an internal division ratio basal value map used in the third embodiment.

According to the present embodiment illustrated in FIG. 9, the control controller 3 includes a first thrust calculating unit 3a, a second thrust calculating unit 3b, and a synthetic thrust calculating unit 3c.

The first thrust calculating unit 3a has the same configuration as that of the control controller 3 according to the above-described first embodiment and functions as a DPS unit. The first thrust calculating unit 3a calculates the thrust of the ship 95 necessary to eliminate the difference between the target location output by the control target controller 4 and the current location of the ship 95. Furthermore, the control controller 3 calculates the turning moment of the ship 95 necessary to eliminate the difference between the target orientation output by the control target controller 4 and the current orientation of the ship 95. Moreover, the first thrust calculating unit 3a outputs an instruction to the synthetic thrust calculating unit 3c so as to obtain the calculated thrust and turning moment.

The second thrust calculating unit 3b functions as a velocity control unit. The second thrust calculating unit 3b receives the input of, for example, the target cruising velocity set via the interface unit 81. Furthermore, the second thrust calculating unit 3b receives the input of the current velocity of the ship 95. The current velocity may be obtained from, for example, the current location of the ship 95 and the location a short time earlier. The second thrust calculating unit 3b calculates the magnitude of thrust in the direction in which the ship 95 is to travel based on the deviation between the target cruising velocity and the current velocity. Although the direction in which the ship 95 is to travel is the direction of the partial route 56s according to the present embodiment, it may be the direction from the current location to the target location.

The synthetic thrust calculating unit 3c selects either the thrust obtained from the first thrust calculating unit 3a or the thrust obtained from the second thrust calculating unit 3b and sets it as an output from the control controller 3. Furthermore, the synthetic thrust calculating unit 3c may also synthesize the thrusts obtained from the two thrust calculating units 3a, 3b to calculate and output an intermediate thrust.

The synthetic thrust calculating unit 3c obtains the internal division ratio indicating a synthesis ratio as a parameter for determining which one of the two thrusts is selected or which is dominant when the two thrusts are synthesized.

The internal division ratio is described below. An XY coordinate system with O as its origin is assumed, and the outputs from the respective thrust calculating units 3a, 3b are represented as two thrust vectors OA, OB. A vector obtained by synthesizing the two thrust vectors at an appropriate ratio may be represented as a vector OP when it is assumed that a point P internally divides a line segment AB at an appropriate ratio. The internal division ratio means the above-described ratio. According to the present embodiment, the internal division ratio has a value that is equal to or more than 0 or equal to or less than 1. When the value of the internal division ratio is 0, it means that only the output of the first thrust calculating unit 3a is used, and when it is 1, it means that only the output of the second thrust calculating unit 3b is used.

Furthermore, when it is assumed that the XY coordinate system has an X-axis as the direction in which the ship 95 is to travel and a Y-axis as the direction perpendicular to it, the synthetic thrust calculating unit 3c synthesizes the two thrust vectors based on the above-described internal division ratio only for components in the direction of the X-axis. For components in the direction of the Y-axis, only the output from the first thrust calculating unit 3a is always used (the output of the second thrust calculating unit 3b is not considered).

Detailed description is given. In the synthetic thrust calculating unit 3c, the thrust vector that is the output of the first thrust calculating unit 3a is decomposed into an X-axis component and a Y-axis component. The thrust vector that is the output of the second thrust calculating unit 3b initially has only an X-axis component and does not have a Y-axis component. The synthetic thrust calculating unit 3c calculates the vector through synthesis using the above-described internal division ratio based on the X-axis component of the thrust vector in the first thrust calculating unit 3a and the thrust vector in the second thrust calculating unit 3b. Subsequently, the synthetic thrust calculating unit 3c adds the Y-axis component of the output vector of the first thrust calculating unit 3a to the calculated synthetic vector of the X-axis components. As a result, the final synthetic vector is obtained.

Thus, the velocity of the ship 95 may be controlled as appropriate while the deviation in the direction along the Y-axis (in other words, the deviation in the route deviation direction) is finely suppressed.

The value of the above-described internal division ratio variously changes depending on the situation. The determination of the internal division ratio is described below. The synthetic thrust calculating unit 3c according to the present embodiment sets the internal division ratio based on the current location (relative location) of the ship 95 with respect to the target location of the target point and the difference between the target orientation of the target point and the current orientation of the ship 95.

The specific method for determining the internal division ratio is as follows. First, the synthetic thrust calculating unit 3c calculates the deviation (hereinafter referred to as orientation deviation) between the target orientation at the target point and the current orientation of the ship 95 and determines the upper limit of the internal division ratio in accordance with the orientation deviation. According to the present embodiment, the control by the second thrust calculating unit 3b becomes more dominant as the internal division ratio increases from 0 to 1. Therefore, the upper limit of the internal division ratio means the limit at which the ratio of control by the second thrust calculating unit 3b does not become dominant any more. When the orientation deviation is large, it means that the ship 95 is not being controlled in the intended orientation; therefore, priority needs to be given to the accurate control on the location of the ship 95 over the control on the velocity of the ship 95. In this case, the synthetic thrust calculating unit 3c may set a small value (e.g., 0.05) as the upper limit of the internal division ratio so as to make adjustment such that the control by the first thrust calculating unit 3a is at least dominant.

Then, the synthetic thrust calculating unit 3c determines an internal division ratio basal value by using a map illustrated in FIG. 10. The internal division ratio basal value means a basal value for determining the internal division ratio. The map represents the correspondence relationship between the internal division ratio basal value and the current location (relative location) of the ship 95 with respect to the target location at the target point (e.g., the transit target point 65). According to the present embodiment, the map of the internal division ratio basal value is defined by the XY coordinate system in which the target location at the target point is the origin, the X-axis is the direction in which the ship 95 is to travel, and the Y-axis is the direction perpendicular to it. A coordinate Xe on the X-axis is a component of the location deviation in the direction along the route on which the ship 95 is to travel, and a coordinate Ye on the Y-axis is a component in the route deviation direction. Typically, the target location at the target point precedes the current location of the ship 95. Therefore, in principle, the coordinate Xe on the X-axis has a negative value. The synthetic thrust calculating unit 3c determines that the internal division ratio is the smaller value out of the internal division ratio basal value obtained by applying the location deviation (Xe, Ye) to the map and the above-described upper limit.

As illustrated in FIG. 10, the map of an internal division ratio basal value is defined such that the internal division ratio basal value is large when the location deviation is small and the internal division ratio basal value is small when the location deviation is large. When the location deviation is large, it means that the ship 95 is not being controlled in the intended location; therefore, priority needs to be given to the accurate control on the location of the ship 95 over the control on the velocity of the ship 95. The synthetic thrust calculating unit 3c may set a small value as the internal division ratio basal value when the location deviation is large so as to make adjustment such that the control by the first thrust calculating unit 3a is dominant.

On the map illustrated in FIG. 10, the region where an internal division ratio basal value is large has a shape that is elongated in the X-axis direction and is shortened in the Y-axis direction. Thus, the sensitivity that causes the control by the first thrust calculating unit 3a to be dominant may be higher for the location deviation Ye in the Y-axis direction than the location deviation Xe in the X-axis direction. Thus, it is possible to ensure that the navigational deviation of the ship 95 is suppressed.

As illustrated in FIG. 10, with the origin O as a reference, the region where the location deviation Xe in the X-axis direction is positive has a small region with a large internal division ratio basal value as compared with the region where it is negative. The situation where the location deviation Xe in the X-axis direction is positive corresponds to the above-described overtaking. In an irregular situation such as overtaking, priority needs to be given to the accurate control on the location of the ship 95 over the control on the velocity of the ship 95. The synthetic thrust calculating unit 3c may set a small value as the internal division ratio basal value in the region of overtaking on the map so as to make adjustment such that the control by the first thrust calculating unit 3a is dominant.

According to the above-described second embodiment illustrated in FIG. 8, when a high target cruising velocity is set, a large arrival range circle is set as the reference for the determination by the arrival determining unit 62. For this reason, there is a tendency that the update of the transit target point 65 precedes the actual movement of the ship 95. Accordingly, the location deviation of the ship 95 becomes large and therefore the target velocity calculated by the control controller 3 becomes high, and as a result, high-velocity navigation of the ship 95 may be achieved. However, with the configuration according to the second embodiment, the value of the target velocity calculated by the control controller 3 is not always stable and, in some situation, there is a possibility that the actual velocity of the ship 95 largely deviates from the target cruising velocity. In this respect, according to the present embodiment, as the velocity is directly controlled by the second thrust calculating unit 3b, the reliability of the velocity control is desirable.

As described above, in the ship-steering control device 1 according to the present embodiment, the control controller 3 includes the first thrust calculating unit 3a, the second thrust calculating unit 3b, and the synthetic thrust calculating unit 3c. The first thrust calculating unit 3a calculates the thrust to be applied to the ship 95 so as to bring the current location of the ship 95 closer to the target location of the control target and bring the current orientation of the ship 95 closer to the target orientation of the control target. The second thrust calculating unit 3b calculates the thrust to be applied to the ship 95 so as to bring the current velocity of the ship 95 closer to the target cruising velocity in accordance with the deviation between the target cruising velocity and the current velocity of the ship 95 in the direction in which the ship 95 is to travel. The synthetic thrust calculating unit 3c may synthesize the thrust obtained by the first thrust calculating unit 3a and the thrust obtained by the second thrust calculating unit 3b and may change the internal division ratio that is the synthesis ratio. The control controller 3 controls the propulsion device 5 of the ship 95 based on the synthesized thrust output by the synthetic thrust calculating unit 3c.

Thus, the automatic navigation may be performed while the degree of emphasis on the location accuracy of the ship 95 and the degree of emphasis on the velocity of the ship 95 are flexibly changed depending on the situation.

Furthermore, in the ship-steering control device 1 according to the present embodiment, the synthetic thrust calculating unit 3c sets the internal division ratio based on the relative current location of the ship 95 with respect to the target location of the control target and the difference between the target orientation of the control target and the current orientation of the ship 95.

Thus, based on the relationship between the current location and the current orientation of the ship 95 and the target location and the target orientation of the control target, the automatic navigation with an emphasis on the location accuracy of the ship 95 may be executed or the automatic navigation with an emphasis on the velocity may be executed.

Although preferred embodiments of the present invention have been described above, the above-described configurations may be modified as described below, for example.

The amount of update change is not always changed in three steps as described above but may be changed in two steps or four or more steps. Furthermore, the amount of update change may be changed with no steps.

The condition for arrival determination is not always changed in three steps as described above but may be changed in two steps or four or more steps. Furthermore, the condition for arrival determination may be changed with no steps.

The amount of update change may be always constant from the start point to the end point of the route 56. Furthermore, the strictness of the condition for arrival determination may be always constant from the start point to the end point of the route 56.

As the condition for arrival determination made by the arrival determining unit 62, the condition based on the distance D2 between the current location of the ship 95 and the partial route 56s may be omitted.

In the example illustrated in FIG. 3, two target orientations are illustrated in an overlapped manner at the waypoints A2, A3. This represents that the ship 95 is turned in a stopped state (turned in a certain position). There are various methods for representing turning in a certain position in the data on the route 56 and, for example, it may be represented by setting the identical target location for two control points and changing only the target orientation. In this case, the length of the partial route 56s connecting the two control points is substantially zero.

The operation at Step S102 in FIG. 4 may be performed by the route controller 2 instead of the control target controller 4. In this case, the route 56 to which the starting point CO is added by the route controller 2 is input to the control target controller 4 at Step S101.

The control target controller 4 may include a display, and the display may be configured to present the display data 64 generated by the display data generating unit 63. The display data 64 may be presented on a display coupled to the ship-steering control device 1.

The control target controller 4 may be implemented by using the same hardware as that of a computer of the route controller 2 or may be implemented by using the same hardware as that of a computer of the control controller 3.

The ship-steering control device 1 may, for example, acquire attitude data from an IMU appropriately installed in the ship 95 and control the operation of the ship 95 by using the attitude data.

The location/orientation information input unit 22 may receive the input of data regarding the current orientation of the ship 95 obtained from the GNSS device 12 and the IMU.

The local map generating unit 32 may use, for example, a Gaussian filter to generate the local map 36 that has reduced region discontinuity and noise.

The wide area map generating unit 33 may acquire the local map 36 and use the data on the local map 36 to generate a wide area map. Furthermore, the wide area map may be updated as appropriate by using the local map 36.

The map generating unit 31 may generate an environment map whose coordinates are converted based on an appropriate method. For example, the local map generating unit 32 may use the installation location and the orientation information of LiDAR to convert the coordinates from the LiDAR coordinate system to the GNSS coordinate system so as to generate the local map 36. Furthermore, the local map generating unit 32 may use the latitude and longitude data of GNSS to convert the coordinates from the GNSS coordinate system to the NEU cartesian coordinate system so as to generate the local map 36.

In the configuration according to the above-described embodiment, the directions of the rotational axes of the screws 6L, 6R are changeable independently. However, the system of the propulsion device 5 may be changed to another system as long as the ship 95 may perform substantially parallel displacement in the horizontal direction, turning in a certain position, etc. For example, it is possible that the propulsion device 5 is configured by using a pair of right and left screws whose directions of the rotational axes are unchangeable, a rudder, and a side thruster provided on the bow side. Furthermore, the propulsion device 5 may be also configured by using a single screw whose direction of the rotational axis is unchangeable, a rudder, and respective side thrusters provided on the bow side and the stern side.

According to the third embodiment, the internal division ratio may be determined based on either the relative current location of the ship 95 with respect to the target location of the control target or the difference between the target orientation of the control target and the current orientation of the ship 95.

DESCRIPTION OF REFERENCE NUMERALS

3 Control controller (propulsion control device)
4 Control target controller (control target generation device)
56 Route
56s Partial route
61 Transit target point generating unit
62 Arrival determining unit
63 Display data generating unit
65 Transit target point
95 Ship

The invention claimed is:

1. A control target generation device that generates a control target for controlling a location and an orientation of a ship in accordance with a route, wherein
the route includes a plurality of control points,
each of the control points has information about a target location and a target orientation of the ship,
the route includes a plurality of partial routes that sequentially connects the target locations of the control points, and
the control target generation device comprises:
a transit target point generating unit that is capable of generating, as the control target in a middle part of the partial route, a transit target point having information about the target location and the target orientation of the ship; and
an arrival determining unit that determines whether the ship has arrived at the transit target point based on a current location and a current orientation of the ship,
in a case where the arrival determining unit determines that the current location of the ship precedes the target location of the transit target point in the partial route, the transit target point generating unit updates the transit target point under a condition that a difference between a current orientation of the ship and the target orientation of the transit target point falls within a predetermined range,
wherein the transit target point generating unit updates the transit target point when the arrival determining unit determines that the ship has arrived at the transit target point, and
when the transit target point is updated, the target location and the target orientation of the transit target point are changed to less than a first threshold from the target location and the target location of the control point at an end point of the partial route.

2. The control target generation device according to claim 1, wherein a magnitude of change in the target location and the target orientation of the transit target point by each update is constant in at least a part of the route.

3. The control target generation device according to claim 1, wherein
an end point of the route is a docking location at which the ship is docked, and
a change in the target location and the target orientation of the transit target point by each update becomes smaller as a distance to the docking location becomes shorter.

4. The control target generation device according to claim 1, wherein, in a case where a magnitude of change in an orientation of the route at the end point of the partial route is more than a predetermined value, a change in the target location and the target orientation of the transit target point by each update is small when the transit target point approaches to the end point of the partial route.

5. The control target generation device according to claim 1, wherein the arrival determining unit determines whether the ship has arrived at the transit target point in consideration of a distance between the partial route and the current location of the ship.

6. The control target generation device according to claim 1, wherein
an end point of the route is a docking location at which the ship is docked, and
the arrival determining unit determines whether the ship has arrived at the transit target point less than a second threshold as a distance to the docking location becomes shorter.

7. The control target generation device according to claim 1, wherein, in a case where a magnitude of change in an orientation of the route at an end point of the partial route is more than a predetermined value, the arrival determining unit determines whether the ship has arrived strictly when the transit target point is approaches the end point.

8. The control target generation device according to claim 1, wherein
the arrival determining unit is capable of determining whether the current location of the ship precedes the target location of the transit target point in the partial route, and
when the arrival determining unit determines that the current location of the ship precedes, the transit target point generating unit updates the transit target point so as to change the target location and the target orientation.

9. A control target generation device that generates a control target for controlling a location and an orientation of a ship in accordance with a route, wherein
the route includes a plurality of control points
each of the control points has information about a target location and a target orientation of the ship,
the route includes a plurality of partial routes that sequentially connects the target locations of the control points, and
the control target generation device comprises:
a transit target point generating unit that is capable of generating, as the control target in a middle part of the partial route, a transit target point having information about the target location and the target orientation of the ship; and
an arrival determining unit that determines whether the ship has arrived at the transit target point based on a current location and a current orientation of the ship
wherein the transit target point generating unit updates the transit target point, and
when the transit target point is updated, the target location and the target orientation of the transit target point are changed so as to approach the target location and the target orientation of the control point at an end point of the partial route, wherein
in a case where the arrival determining unit determines that the current location of the ship precedes the target location of the transit target point in the partial route, the transit target point generating unit updates the transit target point under a condition that a difference between a current orientation of the ship and the target orientation of the transit target point falls within a predetermined range.

10. The control target generation device according to claim 1, comprising a display data generating unit that generates display data for displaying a target location and a target orientation of the transit target point in a graphic form.

11. A ship-steering control device comprising:
the control target generation device according to claim 1; and
a propulsion control device that controls a propulsion device of the ship such that the current location of the ship is less than the first threshold from the target location of the control target and the current orientation of the ship is less than the first threshold in the target orientation of the control target.

12. The ship-steering control device according to claim 11, wherein
the propulsion control device sets a target velocity of the ship based on a location deviation that is a deviation between the target location input from the control target generation device and the current location of the ship,
the propulsion control device controls the propulsion device of the ship such that a current velocity of the ship is less than a third threshold from the target velocity of the ship,
the propulsion control device includes a target velocity calculation model for determining a magnitude of the target velocity of the ship based on the location deviation,
the arrival determining unit determines that the ship has arrived at the target location when a distance between the target location and the current location of the ship is less than a second threshold,
the arrival determining unit includes an inverse model of the target velocity calculation model, and
the arrival determining unit obtains the location deviation corresponding to a magnitude of a target cruising velocity from the inverse model and, based on the obtained location deviation, sets the first threshold regarding the distance between the target location and the current location of the ship.

13. The ship-steering control device according to claim 11, wherein
the propulsion control device includes:
a first thrust calculating unit that calculates a thrust to be applied to the ship so as to bring the current location of the ship less than the first threshold from the target location of the control target and bring the current orientation of the ship less than the first threshold in the target orientation of the control target;
a second thrust calculating unit that calculates a thrust to be applied to the ship so as to bring the current velocity of the ship closer to the target cruising velocity in accordance with a deviation between the target cruising velocity and the current velocity of the ship in a direction in which the ship is to travel; and
a synthetic thrust calculating unit that is capable of synthesizing the thrust calculated by the first thrust calculating unit and the thrust calculated by the second thrust calculating unit and is capable of changing a synthesis ratio, and that controls the propulsion device of the ship based on the synthesized thrust output from the synthetic thrust calculating unit.

14. The ship-steering control device according to claim 13, wherein the synthetic thrust calculating unit determines the synthesis ratio based on at least any of a relative current location of the ship with respect to the target location of the control target and a difference between the target orientation of the control target and the current orientation of the ship.

15. A control target generation device that generates a control target for controlling a location and an orientation of a ship in accordance with a route, wherein
the route includes a plurality of control points,
each of the control points has information about a target location and a target orientation of the ship,
the route includes a plurality of partial routes that sequentially connects the target locations of the control points, and
the control target generation device comprises:
a transit target point generating unit that is capable of generating, as the control target in a middle part of the partial route, a transit target point having information about the target location and the target orientation of the ship; and
an arrival determining unit that determines whether the ship has arrived at the transit target point based on a current location and a current orientation of the ship, the transit target point generation unit updates the transit target point on the condition that a difference between the current location of the ship and the target location of the transit target point is within a predetermined range,
wherein the transit target point generating unit updates the transit target point when the arrival determining unit determines that the ship has arrived at the transit target point, and
when the transit target point is updated, the target location and target orientation of the transit target point change so as to approach, respectively, the target location and the target orientation of the control point at an end of the partial route.

* * * * *